US011176623B2

(12) United States Patent
Bedoya et al.

(10) Patent No.: US 11,176,623 B2
(45) Date of Patent: Nov. 16, 2021

(54) CROP COMPONENT COUNT

(71) Applicant: THE CLIMATE CORPORATION, San Francisco, CA (US)

(72) Inventors: Juan Pablo Bedoya, Berkeley, CA (US); Victor Stuber, El Cerrito, CA (US); Gerard Guillemette, Alameda, CA (US); Joost Kemink, San Francisco, CA (US); Yaqi Chen, Chesterfield, MO (US); Daniel Williams, San Francisco, CA (US); Ying She, Union City, CA (US); Marian Farah, San Francisco, CA (US); Julian Boshard, Berkeley, CA (US); Wei Guan, Pleasanton, CA (US)

(73) Assignee: The Climate Corporation, San Francisco, CA (US)

( * ) Notice: Subject to any disclaimer, the term of this patent is extended or adjusted under 35 U.S.C. 154(b) by 115 days.

(21) Appl. No.: 16/595,420

(22) Filed: Oct. 7, 2019

(65) Prior Publication Data

US 2020/0051180 A1 Feb. 13, 2020

Related U.S. Application Data

(63) Continuation of application No. 15/688,567, filed on Aug. 28, 2017, now Pat. No. 10,438,302.

(51) Int. Cl.
*G06K 9/00* (2006.01)
*G06Q 50/02* (2012.01)
(Continued)

(52) U.S. Cl.
CPC ............ *G06Q 50/02* (2013.01); *A01B 79/005* (2013.01); *A01D 41/1273* (2013.01); *A01G 7/06* (2013.01);
(Continued)

(58) Field of Classification Search
CPC ............ G06Q 50/02; G06Q 9/78; G06K 9/46; G06K 9/00657; G06K 9/4604
See application file for complete search history.

(56) References Cited

U.S. PATENT DOCUMENTS 6,654,506 B1 11/2003 Luo et al.
6,837,617 B1 1/2005 Koltunov
(Continued)

FOREIGN PATENT DOCUMENTS

WO WO2013/101547 A1 7/2013
WO WO 2014/018427 A2 1/2014
(Continued)

OTHER PUBLICATIONS

Paulsen et al., Corn Kernel Crown Shape Identification Using Image Processing, 1997 American Society of Agricultural Engineers 0001-2351 / 97 /, pp. 833-838.*
(Continued)

*Primary Examiner* — Guillermo M Rivera-Martinez
(74) *Attorney, Agent, or Firm* — Hickman Becker Bingham Ledesma LLP

(57) ABSTRACT

In an embodiment, a computer-implemented method is disclosed. The method comprises causing a camera to continuously capture surroundings to generate multiple images and causing a display device to continuously display the multiple images as the multiple images are generated. In addition, the method comprises processing each of one or more of the multiple images. The processing comprises identifying at least one of a plurality of diseases and calculating at least one disease score associated with the at least one disease for a particular image; causing the display device to display information regarding the at least one disease and the at least one disease score in association with a currently displayed image; receiving input specifying one or more of the at least one disease; and causing the display
(Continued)

device to show additional data regarding the one or more diseases, including a remedial measure for the one or more diseases.

19 Claims, 17 Drawing Sheets

(51) Int. Cl.

| | |
|---|---|
| G06K 9/46 | (2006.01) |
| G06K 9/68 | (2006.01) |
| A01D 41/127 | (2006.01) |
| G01D 21/02 | (2006.01) |
| A01B 79/00 | (2006.01) |
| A01G 7/06 | (2006.01) |
| A01D 91/00 | (2006.01) |
| A01G 22/00 | (2018.01) |

(52) U.S. Cl.
CPC ......... *G01D 21/02* (2013.01); *G06K 9/00657* (2013.01); *G06K 9/46* (2013.01); *G06K 9/68* (2013.01); *A01D 91/00* (2013.01); *A01G 22/00* (2018.02)

(56) References Cited

U.S. PATENT DOCUMENTS

| | | | |
|---|---|---|---|
| 2004/0001636 | A1 | 1/2004 | Micel et al. |
| 2004/0146615 | A1 | 7/2004 | McDonald |
| 2008/0304710 | A1* | 12/2008 | Xu .................... G06K 9/342 382/110 |
| 2010/0132023 | A1 | 5/2010 | Reese et al. |
| 2012/0114187 | A1 | 5/2012 | Duarte |
| 2013/0070126 | A1 | 3/2013 | Albu |
| 2013/0136312 | A1 | 5/2013 | Tseng et al. |
| 2014/0009600 | A1 | 1/2014 | Ibamoto |
| 2014/0023243 | A1* | 1/2014 | Nagaraj ............ G06K 9/00624 382/110 |
| 2014/0035752 | A1 | 2/2014 | Johnson |
| 2014/0294247 | A1* | 10/2014 | Sirault ..................... G06T 7/12 382/110 |
| 2014/0301607 | A1 | 10/2014 | Anderson |
| 2014/0376815 | A1* | 12/2014 | Nomura ............... G06F 16/783 382/195 |
| 2015/0187109 | A1 | 7/2015 | Mentzer |
| 2015/0206255 | A1 | 7/2015 | Groeneveld |
| 2016/0000020 | A1 | 1/2016 | Sugimoto |
| 2016/0021891 | A1* | 1/2016 | von Maltzahn ........ A01N 63/00 800/298 |
| 2016/0093037 | A1* | 3/2016 | Spalding ............... G06T 7/0012 382/110 |
| 2016/0148104 | A1 | 5/2016 | Itzhaky et al. |
| 2016/0223506 | A1 | 8/2016 | Shriver et al. |
| 2016/0225135 | A1* | 8/2016 | Young ..................... G06T 7/90 |
| 2016/0239709 | A1 | 8/2016 | Shriver |
| 2016/0253595 | A1 | 9/2016 | Mathur et al. |
| 2016/0300363 | A1* | 10/2016 | Young ..................... G06T 7/90 |
| 2016/0309646 | A1* | 10/2016 | Starr ................... A01B 79/005 |
| 2017/0206415 | A1 | 7/2017 | Redden |
| 2017/0223947 | A1 | 8/2017 | Gall |
| 2017/0374323 | A1 | 12/2017 | Gornik |
| 2018/0143410 | A1* | 5/2018 | Chazallet ............... G03B 15/00 |
| 2018/0259496 | A1 | 9/2018 | McPeek |
| 2019/0019281 | A1* | 1/2019 | Berghoefer .......... G06T 7/0004 |
| 2019/0066234 | A1 | 2/2019 | Bedoya |
| 2019/0108413 | A1 | 4/2019 | Chen |
| 2019/0384998 | A1 | 12/2019 | Chen et al. |

FOREIGN PATENT DOCUMENTS

| | | |
|---|---|---|
| WO | WO 2016/025848 A1 | 2/2016 |
| WO | WO 2016/110832 A1 | 7/2016 |
| WO | WO2017/078886 A1 | 5/2017 |

OTHER PUBLICATIONS

Canada Patent Office, "Office Action" in application No. 3,074,217, dated Dec. 14, 2020, 4 pages.
Canada Claims in application No. 3,074,217, dated Dec. 2020, 5 pages.
Brazilian Patent Office, "Written Opinion" in Application No. 1120200041157, dated Nov. 10, 2020, 4 pages.
Brazilian Claims in Application No. 1120200041157, dated Nov. 2020, 4 pages.
European Patent Office, "Search Report" in application No. 18850794.1-1213, dated Jul. 7, 2020, 11 pages.
European Claims in application No. 18850794.1-1213, dated Mar. 26, 2020, 4 pages.
Canadian Patent Office, "Search Report" in application No. 3,074,217, dated May 25, 2020, 5 pages.
Canadian Claims in application No. 3,074,217, dated May 2020, 5 pages.
The International Bureau of WIPO, "International Preliminary Reporton Patentability" in application No. PCT/US2018/048169, dated Mar. 3, 2020, 9 pages.
European Patent Office, "Search Report" in application No. 18850794.1-1213 dated Apr. 8, 2020, 3 pages.
European Claims in application No. 18850794.1-1213, dated Apr. 2020, 4 pages.
M. Arjovsky and L. Bottou. "Towards Principled Methods for Training Generative Adversarial Networks", CoRR, abs/1701.04862, dated 2017, 41 pages.
Current Claims in application No. PCT/US2018/054348 dated Dec. 2018, 5 pages.
Gavhale et al., "An Overiew of the Research on Plant Leaves Disease Detection Using Image Processing Techiques", IOSR Journal of Computer Engineering, vol. 16, Issue 1, dated Jan. 2014, 7 pages.
Girshick et al., "Rich Feature Hierarchies for Accurate Object Detection and Semantic Segmentation",Proceedings of the 2014 IEEE Conference on Computer Vision and Pattern Recognition, 2014, 21pages.
H. A. Rowley, S. Baluja, and T. Kanade. "Neural Network-based Face Detection". IEEE Trans. Pattern Anal. Mach. Intell., 20(1):23-38, dated Jan. 1998. ISSN 0162-8828, 6 pages.
I. Gulrajani, F. Ahmed, M. Arjovsky, V. Dumoulin, and A. C. Courville. Improved training of wasserstein gans. CoRR, abs/1704.00028, dated 2017, 19 pages.
I. J. Goodfellow, J. Pouget-Abadie, M. Mirza, B. Xu, D. Warde-Farley, S. Ozair, A. Courville, and Y. Bengio. "Generative Adversarial Networks". ArXiv e-prints, Jun. 2014, 9 pages.
International Searching Authority, "Search Report" in application No. PCT/US2018/048169, dated Dec. 10, 2018, 19 pages.
J. Hoffman, S. Guadarrama, E. Tzeng, J. Donahue, R. B. Girshick,T. Darrell, and K. Saenko. "LSDA: Large Scale Detection Through Adaptation". CoRR, abs/1407.5035, dated 2014, 9 pages.
J. Hosang, R. Benenson, and B. Schiele. "How Good are Detection Proposals, Really?" In BMVC, dated 2014, 25 pages.
J. R. R. Uijlings, K. E. A. van de Sande, T. Gevers, and A. W. M. Smeulders. "Selective Search for Object Recognition", International Journal of Computer Vision, dated 2013, 14 pages.
J. Redmon, S. K. Divvala, R. B. Girshick, and A. Farhadi. "You Only Look Once: Unified, Real-time Object Detection". CoRR, abs/1506.02640, dated 2015, 10 pages.
Current Claims in application No. PCT/US2018/048169, dated Dec. 2018, 3 pages.
L. Z. Piotr Dollar. "Structured Forests for Fast Edge Detection". In ICCV, Dec. 2013, 8 pages.
Valliammal et al., "A Novel Approach for Planet Leaf Image Segmentation Using Fuzzy Clustering", International Journal of Computer Applications, dated Oct. 20, 2012, 11 pages.
M. Arjovsky, S. Chintala, and L. Bottou. "Wasserstein GAN". CoRR, abs/1701.07875, dated 2017, 32 pages.
Montes et al., "Practical Computer Vision: Theeory and Applications", Basque Center for Applied Mathematics dated 2015, 61 pages.

(56) References Cited

OTHER PUBLICATIONS

N. Dalal and B. Triggs. "Histograms of Oriented Gradients for Human Detection", In 2005 IEEE, Computer Society Conference on Computer Vision and Pattern Recognition, Jun. 1, 2005, 8 pages.

P. D. Larry Zitnick. "Edge Boxes: Locating Object Proposals From Edges". In ECCV. European Conference on Computer Vision, dated Sep. 2014,15 pages.

P. Dollár and C. L. Zitnick. "Fast Edge Detection Using Structured Forests", IEEE Trans. Pattern Anal. Mach. Intell., 37(8):1558-1570, 2015, 13 pages.

P. Sermanet, D. Eigen, X. Zhang, M. Mathieu, R. Fergus, and Y. Le-Cun. "Overfeat: Integrated Recognition, Localization and Detection Using Convolutional Networks". CoRR, dated 2013, 26 pages.

R. Girshick. "Fast R-CNN", In Proceedings of the International Conference on Computer Vision (ICCV), dated 2015, 9 pages.

R. Rothe, M. Guillaumin, and L. V. Gool. "Non-maximum Suppression for Object Detection by Passing Messages Between Windows.", In Asian Conference on Computer Vision (ACCV), Nov. 2014, 16 pages.

Ren et al., "Faster r-cnn: Towards realtime object detection with region proposal networks", Advances in Neural Information Processing Systems 28, pp. 91-99. Curran Associates, Inc., dated 2015.

T. Salimans, I. J. Goodfellow, W. Zaremba, V. Cheung, A. Radford, and X. Chen. "Improved Techniques for Training Gans". CoRR, abs/1606.03498, dated 2016, 10 pages.

The International Searching Authority, "Search Report" in application No. PCT/US2018/054348 dated Dec. 7, 2018, 11 pages.

K. He, X. Zhang, S. Ren, and J. Sun. Spatial pyramid pooling in deep convolutional networks for visual recognition. CoRR, abs/1406.4729, dated 2014, 14 pages.

Chen, U.S. Appl. No. 15/725,284, filed Oct. 5, 2017, Notice of Allowance, dated May 15, 2019.

Bedoya, U.S. Appl. No. 15/688,567, filed Aug. 28, 2017, Office Action, dated Nov. 16, 2018.

Bedoya, U.S. Appl. No. 15/688,567, filed Aug. 28, 2017, Notice of Allowance, dated Aug. 8, 2019.

Bedoya, U.S. Appl. No. 15/688,567, filed Aug. 28, 2017, Interview Summary, dated Feb. 14, 2019.

Bedoya, U.S. Appl. No. 15/688,567, filed Aug. 28, 2017, Final Office Action, dated May 31, 2019.

Bedoya, U.S. Appl. No. 15/688,567, filed Aug. 28, 2017, Advisory Action, dated Aug. 5, 2019.

Chen, U.S. Appl. No. 16/554,485, filed Aug. 28, 2019, Notice of Allowance, dated May 18, 2020.

\* cited by examiner

Fig. 2
(a)
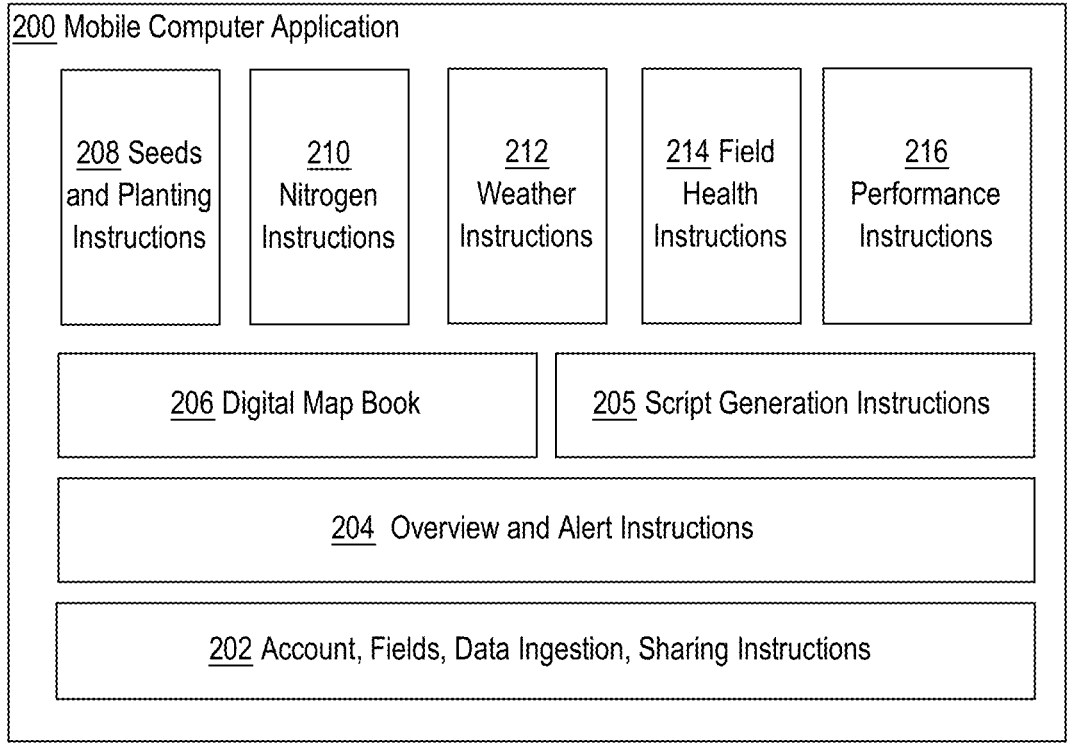
(b)
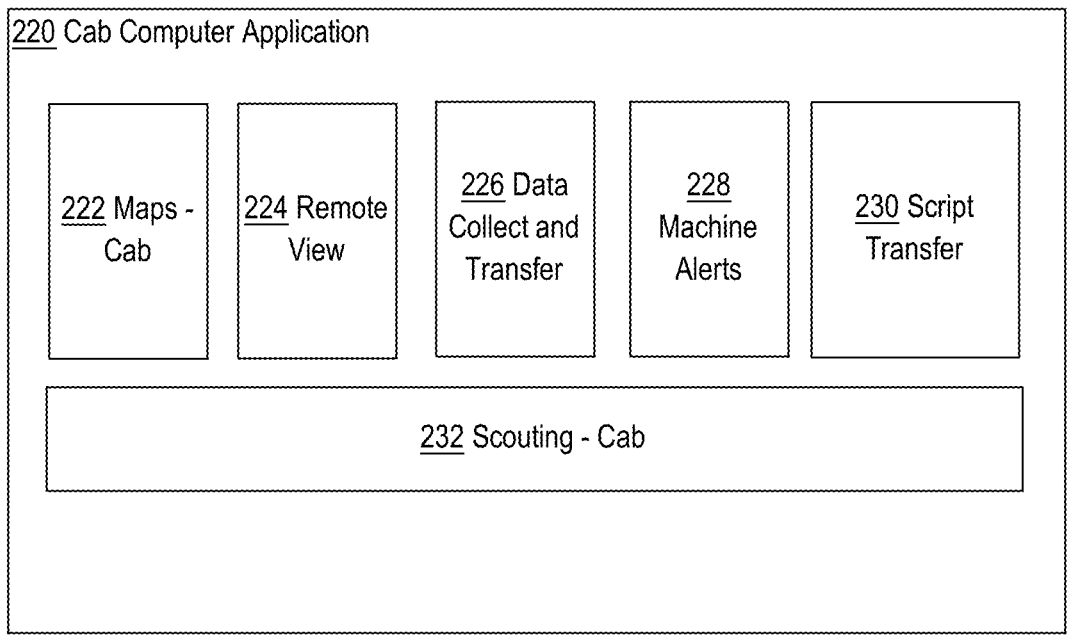

FIG. 5

Data Manager

[Nitrogen] [Planting] [Practices] [Soil]

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1 Corn \| 100 \| Boone, IA | Corn | — | DMC82-M | 112 | 160 | 34000 | Apr |
| ☐ Austin, MN 1 Corn \| 100 \| Fredricks, MN | Corn | — | DMC82-M | 114 | 160 | 36000 | Apr |
| ☐ Boone, IN 1 Corn \| 100 \| Boone, IA | Corn | — | DMC82-M | 112 | 150 | 34000 | Apr |
| ☐ Champaign 1 Corn \| 100 \| Champaign, IL | Corn | — | — | 112 | 200 | 34000 | Apr |
| ☐ E Nebraska 1 Corn \| 100 \| Burt, NE | Corn | — | — | 112 | 160 | 34000 | Apr |

*FIG. 6*

Disease Found — 1214, 1200 — Done

1202

1204 — Gray Leaf Spot

93% Confidence — 1206

Symptoms

Lesions first appear as small, necrotic spots with halos

1208 — The lesions become rectangular, 2-4 mm to 1-6 mm in size and have a gray appearance Mature lesions have distinct parallel edges and appear opaque when put up to the light Pathogen Involved 1210 — Cercospora zeae-maydis (a fungus)

1212 — Is this diagnosis accurate?  Yes   No

*FIG. 12*

CROP COMPONENT COUNT

BENEFIT CLAIM

This application claims the benefit under 35 U.S.C. § 120 as a continuation of U.S. patent application Ser. No. 15/688,567, filed Aug. 28, 2017, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019 The Climate Corporation.

FIELD OF THE DISCLOSURE

The present disclosure relates to crop field evaluation and more specifically to detection of crop diseases and estimation of crop yield.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A grower can manage a number of crop fields. Given the possible sizes of the fields and the numbers of plants in these fields, it can be time-consuming and labor-intensive to evaluate the status, maintain the health, and maximize the yield of the fields. It can be helpful to have tools that assist a grower in discovering the occurrence of crop diseases or in estimating the current crop yield.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 12 illustrates an example computer interaction device showing a GUI under program control that can provide additional information about recognized diseases.

DETAILED DESCRIPTION

Figure 1:
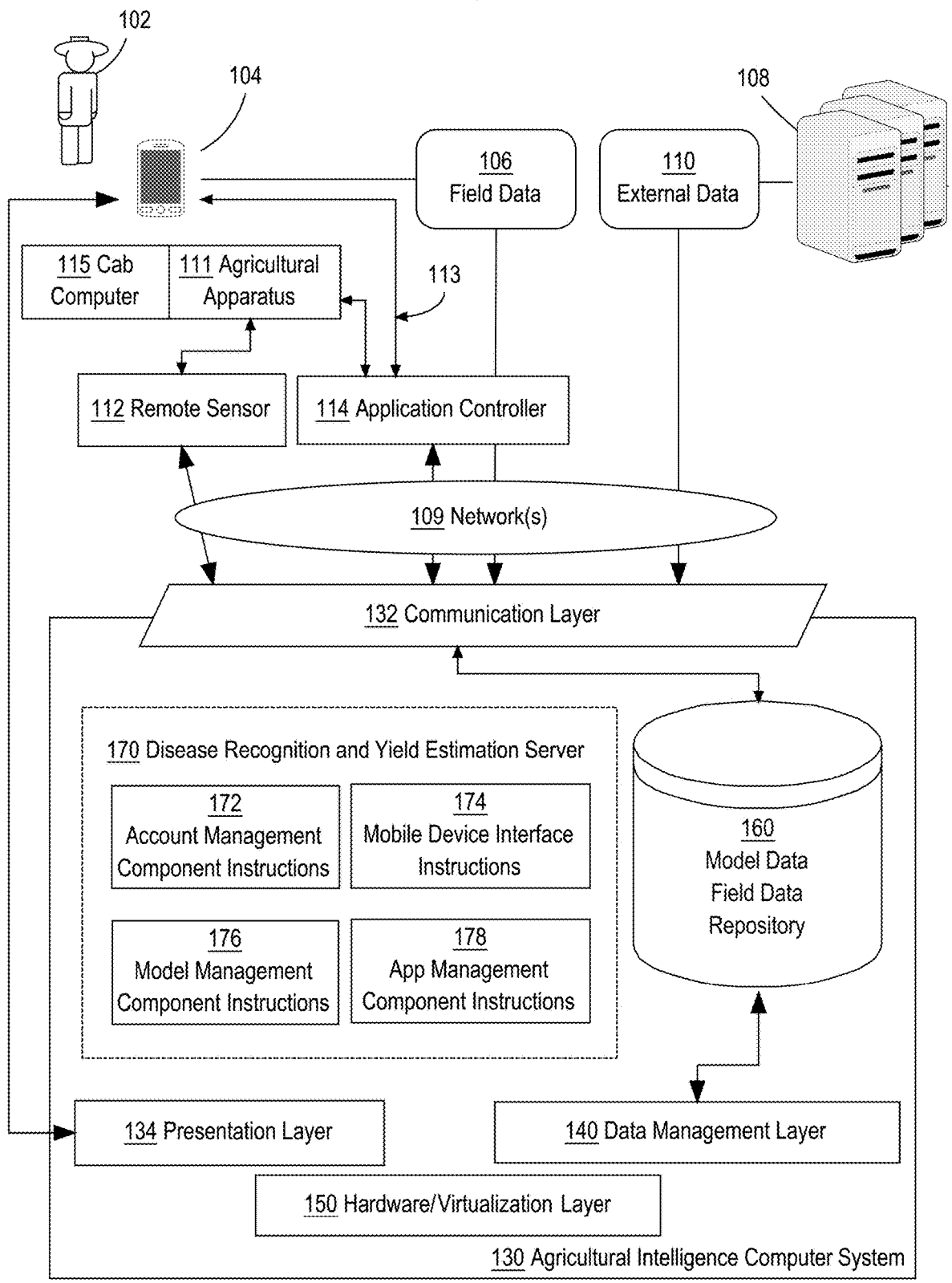
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
  2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4 PROCESS OVERVIEW—AGRONOMIC MODEL TRAINING
    2.5 DISEASE RECOGNITION AND YIELD ESTIMATION
    2.6 IMPLEMENTATION EXAMPLE—HARDWARE OVERVIEW
  3. FUNCTIONAL DESCRIPTION
    3.1 CONSTRUCTION OF A COMPUTER PROGRAM FOR MANAGING A FIELD EVALUATION PROCESS 3.1.1 RECOGNIZING DISEASES OR CROP TYPES
3.1.2 ESTIMATING CROP YIELD
3.2 EXECUTION OF THE COMPUTER PROGRAM FOR MANAGING A FIELD EVALUATION PROCESS
3.2.1 RECOGNIZING DISEASES OR CROP TYPES
3.2.2 ESTIMATING CROP YIELD

1. General Overview

A disease recognition and yield estimation system and related methods are disclosed. in some embodiments, the system includes a server and one or more client computers. The server can be programmed or configured with data structures and/or database records that are arranged to develop models or techniques for identifying diseases or crop types and estimating crop yield. The server can also be configured to build a computer program that invokes the models or techniques and deploy the computer program to each of the client computers. Each client computer can be a mobile device, such as a cellular phone or a tablet, which can be used by a grower as the grower walks through one of the crop fields. By executing the computer program, such as a mobile app, the client computer can be programmed or configured with data structures and/or database records that are arranged to continuously scan the crops in the field and recognize the type of a crop or detect an occurrence of a disease in a crop in real time. In response to detecting an occurrence of a disease, the client computer can be programmed to cause display information regarding the occurrence and additional data about the disease, such as possible causes and treatment regimes. In response to recognizing corn, for example, the client computer can be programmed to cause display of a kernel count and additional information, such as an estimated corn yield for the field. In this disclosure, the term "corn" is equivalent to "maize".

The disease recognition and yield estimation system and related methods produce many technical benefits. First, the system and methods apply robust classification and image processing techniques and produce accurate diagnosis of crop health and estimation of crop yield. Second, the system and methods manage an end-to-end process from entering a crop field to receiving a field-wide evaluation of crop growth by properly coordinating communication among different electronic components, such as a processor, an image capturing device, and a display device. Third, the system and methods generally require a relatively small footprint that allows efficient utilization of resources typically found in a mobile device and thus can readily be implemented by such a device, leading to reduced digital communication overhead and manual handling issues. Third, the system and methods are designed to handle continuous data streams and achieve high processing throughput, thereby offering comprehensive information in near real time.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
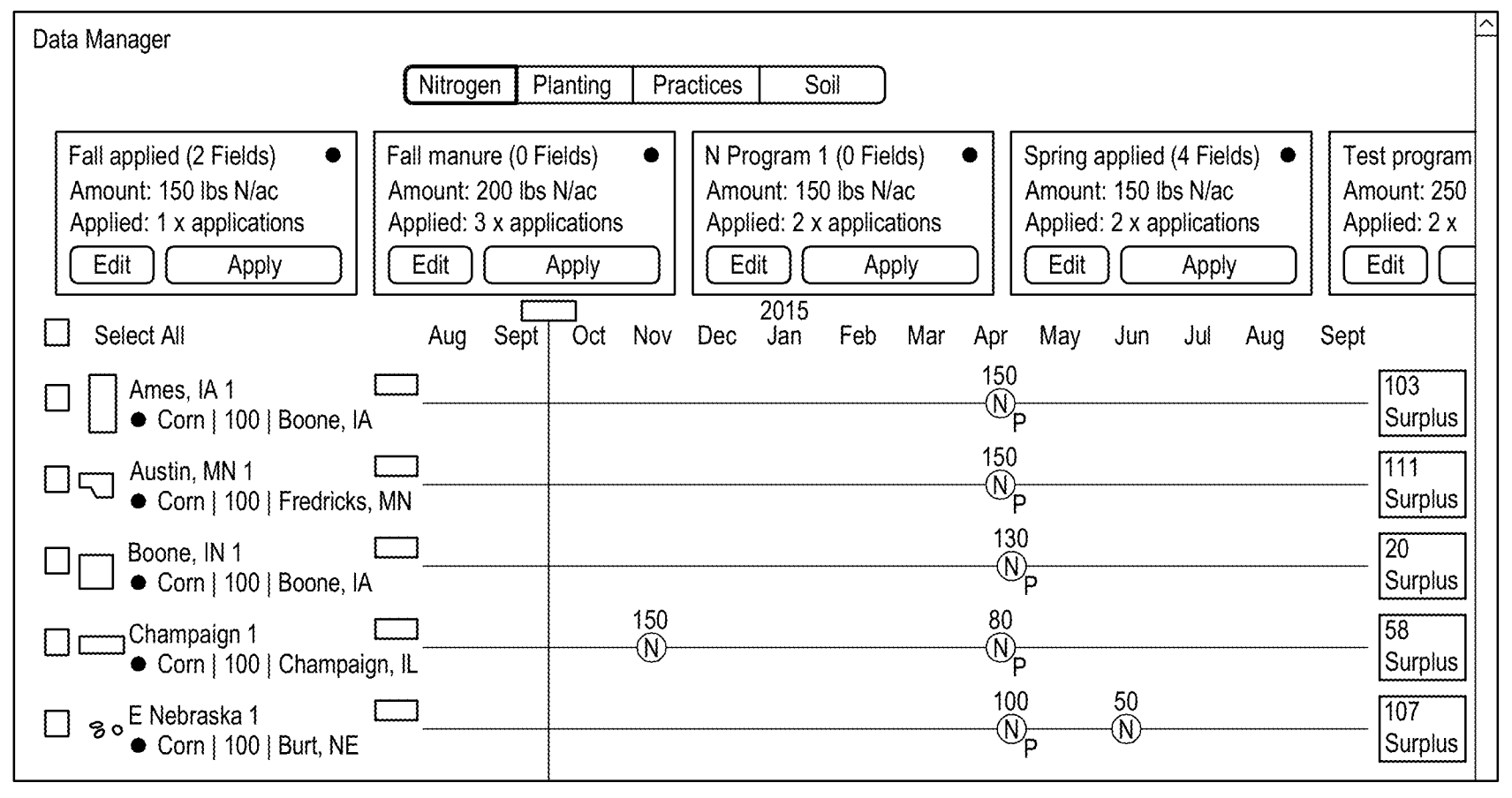

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

The disease recognition and yield estimation server 170 ("the server") comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the model management component 176 may comprise a set of pages in RAM that contain instructions which when executed cause performing the nutrient modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the components in the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
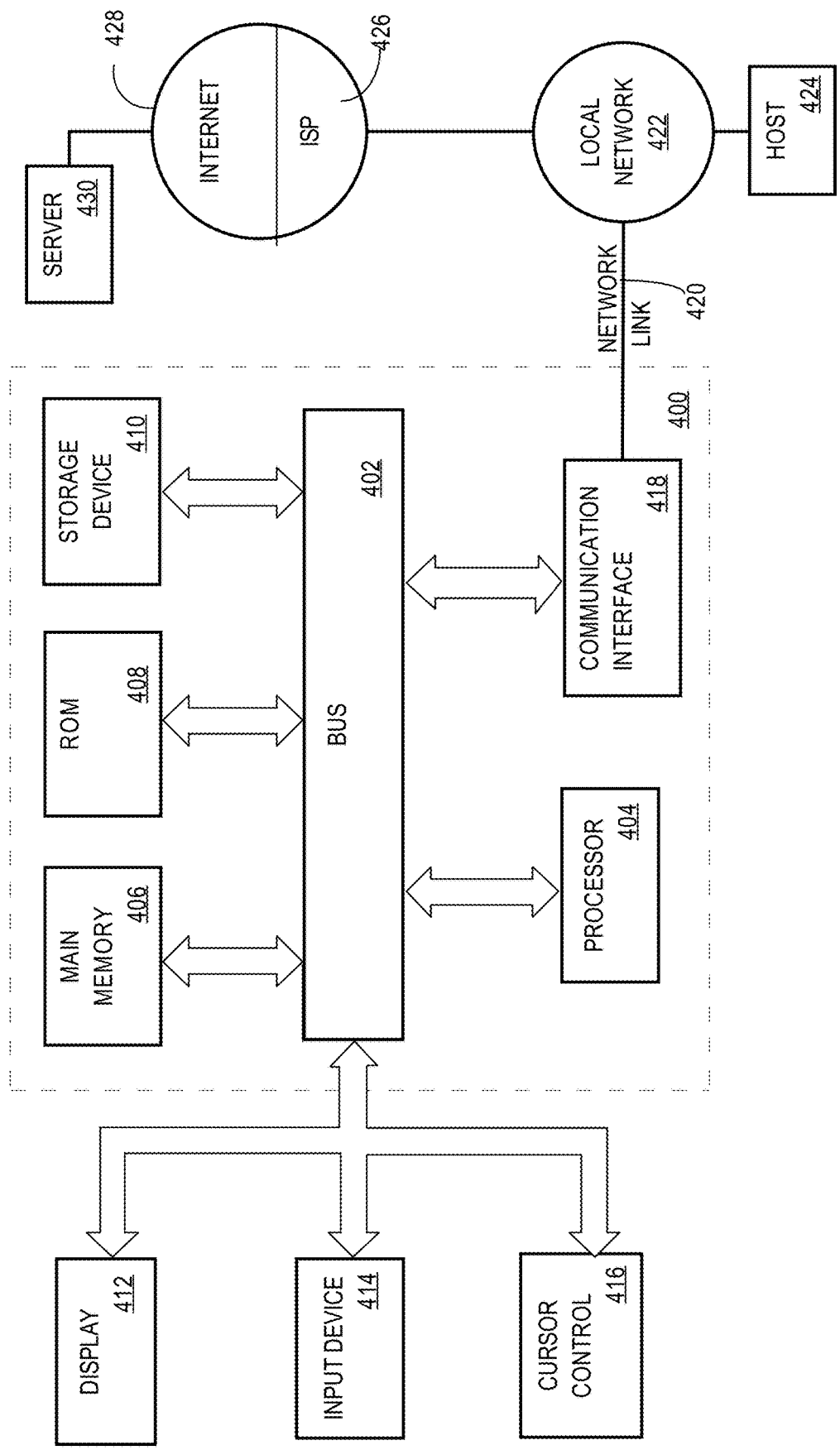
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph.

The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
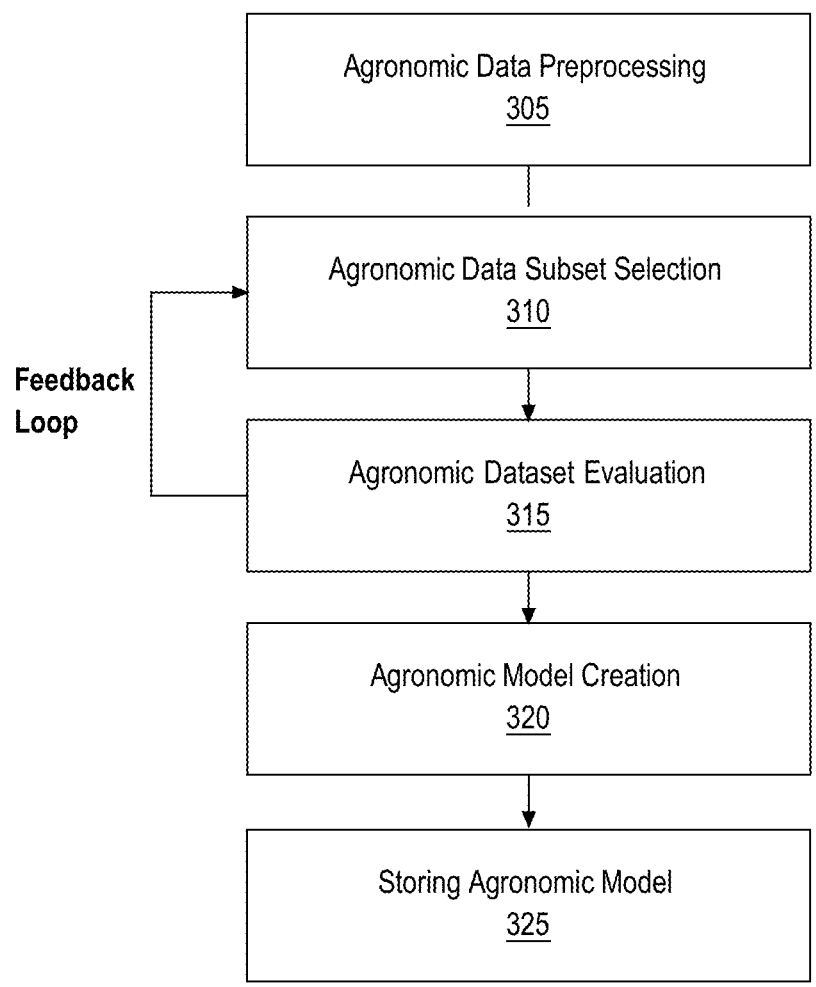
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Disease Recognition and Yield Estimation

In some embodiments, the agricultural intelligence computer system 130 includes a disease recognition and yield estimation server ("the server") 170. The server 170 comprises an account management component 172, a mobile device interface 174, a model management component 176, and an app management component 178.

In some embodiments, the account management component 172 is programmed to maintain accounts corresponding to users or client computers. Data generated by the server or a client computer for an account can be stored under the account and made available to any users having access to the account. The model management component 176 is programmed to create and update a first model or technique for recognizing diseases and crop types as sets of computer-executable instructions. The first model generally accepts an image as input and produces an identification of a disease or a crop type and related information as output. The model management component 176 is also programmed to create and update a second model or technique for estimating yield for a crop and for a field of crops as sets of computer-executable instructions. The second model generally accepts an image as input and produces a yield amount for the crop and a corresponding yield amount for a field of crops.

In some embodiments, the app management component 178 is programmed to create and update a computer program having computer-executable instructions, such as a mobile app, that enables a client computer to manage a crop field evaluation process. The computer program can manage a graphical user interface ("GUI") coupled with a backend engine to process input and output data associated with the GUI. The backend engine could invoke the first model for recognizing diseases and crop types or the second model for estimating crop yield for a crop field. The mobile device interface 174 is configured to communicate with a client computer over a communication network, through the communication layer 132. The communication can include receiving a request for the computer program from a client computer, transmitting the computer program to a client computer, receiving account data from a client computer, or sending account data to a client computer. Account data can include data provided by a user of a client computer or automatically generated by a client computer.

Figure 7:
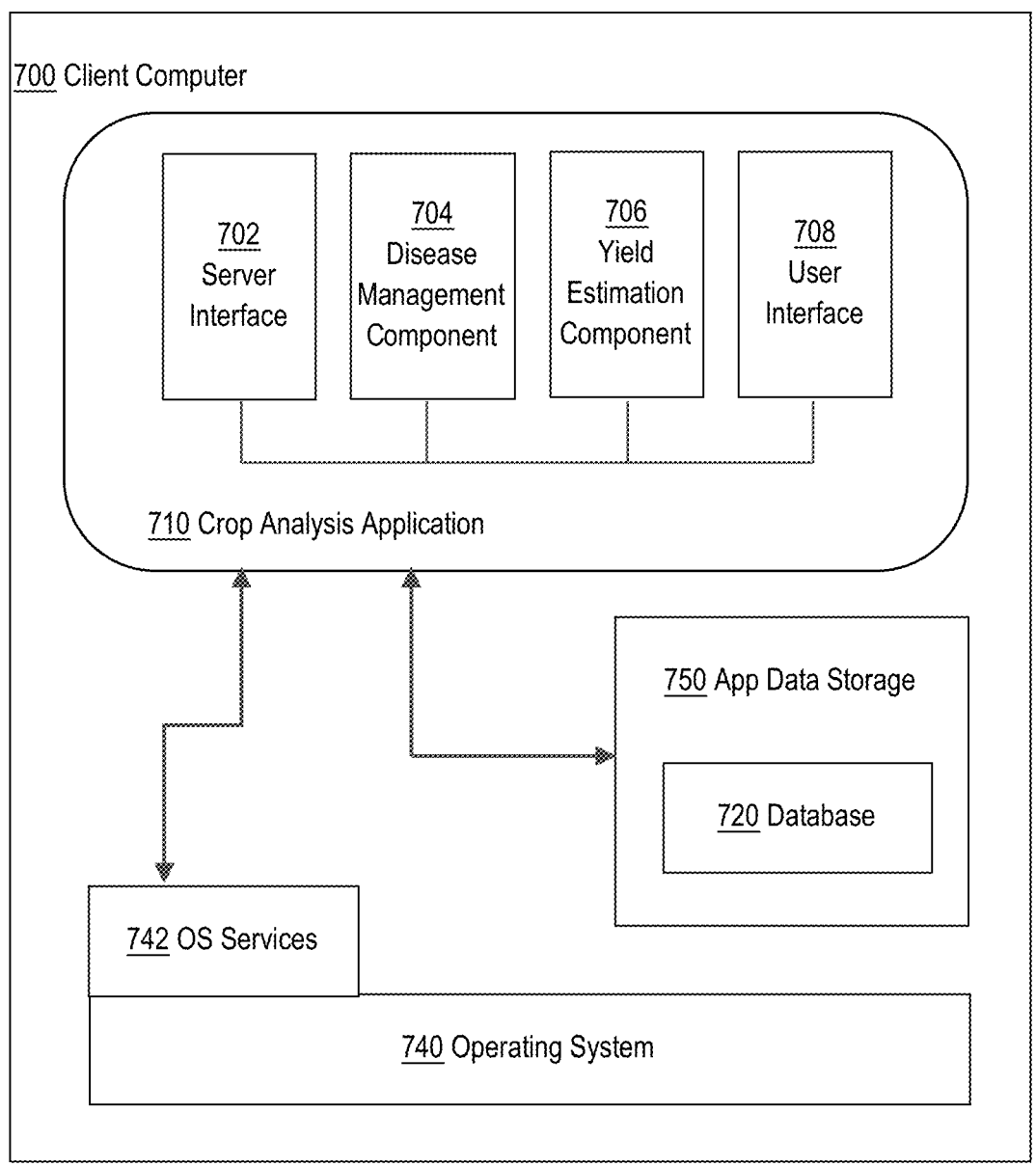
FIG. 7 illustrates example components of a client computer.

FIG. 7 illustrates example components of a client computer. The client computer 700 can be field manager computing device 104, cab computer 115, or any other mobile device. The client computer 700 can be an integrated device that includes an image capturing device, such as a camera, or a display device, such as a screen. The client computer can also communicate with external image capturing or display devices through its networking capabilities.

In some embodiments, the client computer 700 can store a crop analysis application 710, which can be the computer program developed by and received from the server. The client computer or the crop analysis application 710 can comprise a server interface 702, a disease management component 704, a yield estimation component 706, and a user interface 708. The server interface 702 is programmed to communicate with the server over a communication network, such as a cellular network. The communication can include sending a request for a computer program that enables the client computer to manage a crop field evaluation process to the server, receiving the computer program from the server, sending account data, such as data provided by a user or automatically generated by the client computer, to the server, or receiving account data, such as data previously provided by a user, from the server. The user interface 708 is programmed to manage a GUI that enables a user to capture the surroundings in a stream of images, coordinates with the disease management component 704 and the yield estimation component 706 which analyze the images, and displays the analysis results. The disease management component 704 is configured to recognize predetermined diseases or crop types from the images. The yield estimation component 706 is programmed to compute a crop yield for a crop, such as a kernel count for a corn ear, and further calculate a crop yield over a crop field.

In some embodiments, the client computer 700 can further comprise an app data storage 750, including a database 720, for storing data associated with the crop analysis application 710. Data stored in the app storage 750 can include some data originally stored in the model data field data repository 160 and transmitted by the server, such as the number of crops in a field or the crop density in a field. Information regarding specific crop diseases, in terms of categories, causes, symptoms, or treatments, can also be stored in the app storage 750. In addition, images analyzed through the crop analysis application 710 and results of the analysis can be stored in the app storage 750.

In some embodiments, the client computer 700 can further comprise an operating system 740 which offer OS services 742. For example, iOS supports AVCam-iOS as a set of application programming interfaces for working with many types of photos and images. Such OS primitives or services can be utilized to execute the crop analysis application 710 efficiently.

FIG. 1 and FIG. 7 illustrate examples only and the agricultural intelligence computer system 130 and the client computer can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically. Some of the components that reside in the server in these examples can reside in the client computer, and vice versa.

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Description

3.1 Construction of a Computer Program for Managing a Field Evaluation Process In some embodiments, the server is programmed to gather training images for each of a group of predetermined diseases. The group of diseases can include grey leaf spot ("GLS"), eye spot ("EYE"), northern leaf blight ("NLB"), Stewart's Wilt, or common rust. Each training image would preferably have been captured in actual crop fields and verified by experts as depicting a single crop infected with one or more of the diseases. Each image is preferably at least 400 pixels by 400 pixels in size. A group of at least 1,000 images for each disease is also preferred. Sample images can be obtained from Plant Village hosted by Pennsylvania State University, College of Agricultural Sciences, for example.

3.1.1 Recognizing Disease or Crop Types

In some embodiments, the server is programmed to build a first model or technique as a set of computer-executable instructions for recognizing one or more diseases in an input image based on the training images. One example of the first model is a convolutional neural network ("CNN"). Any existing neural network implementation, such as the Keras compatible with Python 2.7-3.5, can be used to implement CNN-related operations. The CNN can be built by fine-tuning an existing model with an additional dataset, such as the group of at least 1,000 images for each of the diseases noted above. The fine tuning can include truncating the last layer of the existing model, using a smaller learning rate, or other approaches. For example, with Keras, an Inception-v3 model can be readily fine-tuned. Specifically, to change the learning rate, the sgd function can be used with lr set to 0.01, decay set to 0.0005, momentum set to 0.9, and nesterov set to True. In addition, to carry out model training in multiple iterations, the fit function can be invoked with batch_size set to 64 and epochs set to 50. With a complete CNN, the first model can output, for each of the group of diseases, a probability that the subject matter depicted in the given image is infected with that disease.

In some embodiments, a crop type can be inferred from a disease. For example, the GLS is known to affect maize or corn, and thus the crop type of corn can be inferred from a disease of GLS. Therefore, the first model can also be used for recognizing crop types. Alternatively, a separate model can be built in a similar manner to specifically recognize crop types based on training images of different crop types.

In some embodiments, other learning techniques known to someone skilled in the art can be used for building the first model, such as decision forests and logistic regression. Metadata of the images can also be used in characterizing each disease, such as the location where the image was created and time when the image was created.

3.2 Estimating Crop Yield

In some embodiments, the server is programmed to build a second model or technique as a set of computer-executable instructions for calculating crop yield per plant and for a crop field. A crop may comprise a group of components. For example, a corn ear may contain a group of kernels, and a citrus tree may contain a group of oranges. The number of components in such a group can be an indicator of the yield of the plant. The size the crop or the total weight of the group of components can be another indicator of the yield. For example, a conventional measure of yield for a corn field is the number of kernels per acre times weight per kernel at standard moisture divided by 56 pounds per bushel to give bushels per acre.

Figure 14:
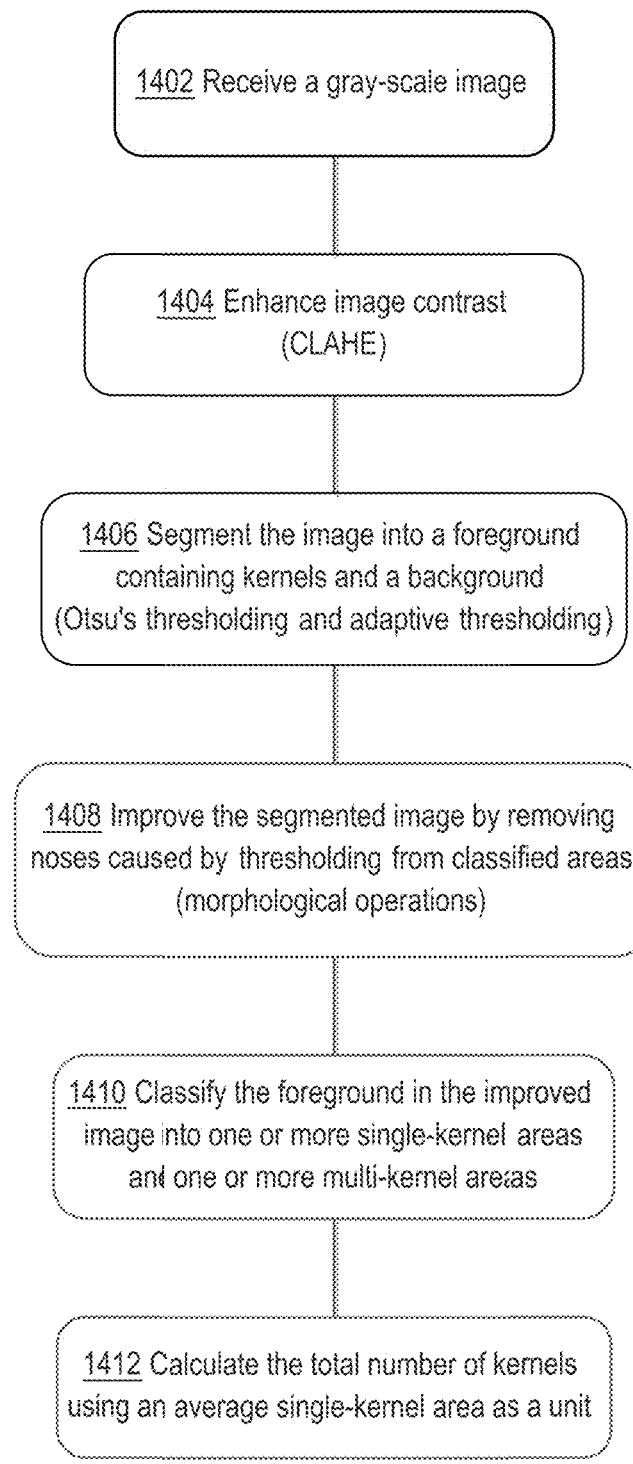
FIG. 14 illustrates an example process typically performed by a client computer to calculate the yield of a crop, such as the number of kernels in an ear of corn (maize).

In some embodiments, to estimate the size of the group or the number of components from a generated image, the second model can comprise certain image processing operations. Any existing image processing implementation, such as the OpenCV library (version 3.2), can be used to implement one or more of the image processing operations of the second model. FIG. 14 illustrates an example process typically performed by a client computer to calculate the yield of a crop, such as the number of kernels in an ear of a corn. The process can be performed through executing the second model.

In step 1402, a grey-scale image is received as input. In step 1404, the image is enhanced in contrast, such as through contrast limited adaptive histogram equalization (CLAHE). For example, the createCLAHE function in OpenCV can be used with clipLimit set to 2 and tileGridSize set to (8, 8). Other contrast enhancement algorithms known to someone skilled in the art can be used, such as many variants of histogram equalization, other non-linear contrast methods, and linear contrast methods.

In step 1406, the enhanced image is segmented into a foreground likely to depict a crop, such as a corn ear and a number of kernels, and a background. The segmentation can be based on the performance of one or more thresholding methods. A first thresholding method can be Otsu's thresholding. For example, the threshold function in OpenCV can be used with thresh set to 0, maxVal set to 255, and thresholdType set to THRESH_BINARY_INV or THRESH_OTSU. A second thresholding method can be an adaptive thresholding method. For example, the adaptiveThreshold function in OpenCV can be used with maxVal set to 255, adaptiveMethod set to ADAPTIVE_THRESH_GAUSSIAN_C, blockSize set to 11, and constant C set to 2. The segmentation can then assign a pixel of the image to the foreground when at least one of the thresholding methods returns an above-threshold determination for the pixel. Other thresholding methods or other types of combining thresholding methods known to someone skilled in the art can be applied. Other segmentation or classification methods known to someone skilled in the art can also be applied.

Figure 15:
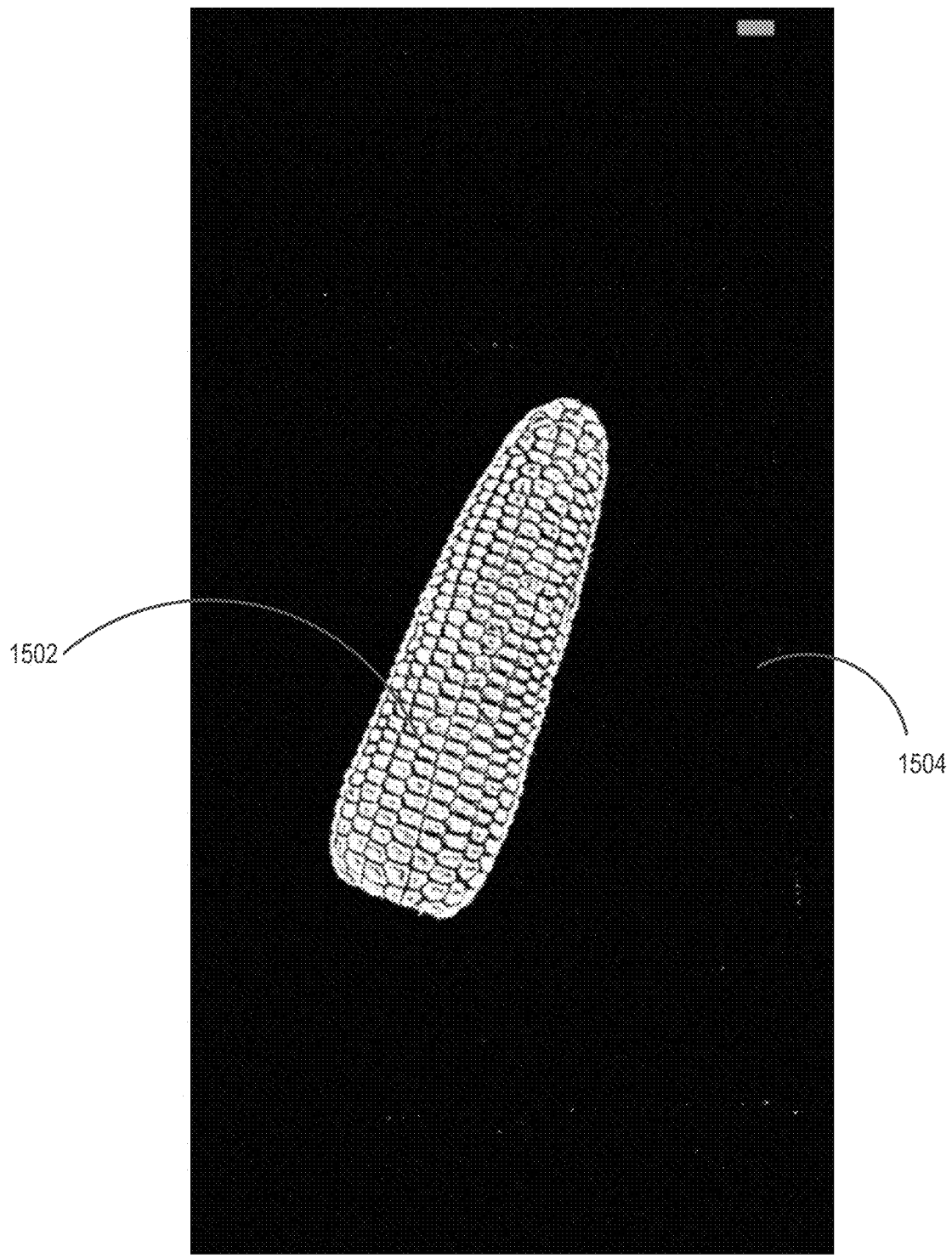
FIG. 15 illustrates an example image that has been enhanced in contrast and segmented into a foreground containing a corn ear and a background.

FIG. 15 illustrates an example image that has been enhanced in contrast and segmented into a foreground depicting a corn ear and a background. The corn ear 1502 with one or more single kernels and multi-kernel clusters constitutes the foreground, and the rest of the image in black constitutes the background.

In step 1408, the segmented image is updated to remove noise pixels resulting from the thresholding, such as through morphological operations. For example, the morphologyEx function in OpenCV can be used with kernel (structuring element in morphological operations) set to a 1 by 1 element, op set to MORPH OPEN, and iterations set to 2. This opening operation is typically useful for removing small objects from an image. When the image depicts a corn ear, for example, the opening operation can help remove the slightly connected area between kernels in a multi-kernel clusters thus disconnect multi-kernel clusters to single kernels. Other methods to smooth out thresholding results, remove outliers, or otherwise clean up images known to someone skilled in the art can be used.

In step 1410 and step 1412, the updated image is further analyzed to calculate the size of the group of components included in the crop, such as the number of kernels in a corn ear. The size of the group can be estimated from the size of a representative component in the group. Determination of the size of a representative component may depend on the crop type.

In some embodiments, for a corn ear, the size of a representative kernel can be determined by first identifying areas in the image foreground that correspond to isolated kernels. Kernels that grow in adjacent positions can be identified as isolated kernels after image processing in the previous steps manifests the separation of the kernels. In addition, a diminished kernel set may exist due to drought stress, insect feeding, pollen desiccation, temperature variance, kernel abortion, or other reasons. Also, some kernels might have fallen off the ear while being captured in the image. In these cases, as in step 1410, the foreground can be divided into connected areas, and a connected area can be deemed to correspond to a multi-kernel cluster when the size of the connected area is above a first predetermined threshold, such as 500 pixels. Furthermore, a connected area can be deemed to correspond to a single kernel when the size of the connected area does not exceed the first predetermined threshold and also does not fall below a second predetermined threshold, such as 5 pixels.

In step 1412, the sizes of the connected areas deemed to correspond to single kernels can be aggregated. The sizes of the connected areas deemed to correspond to multi-kernel clusters and the aggregate size of the connected areas deemed to correspond to single kernels can be used to calculate the number of kernels in each multi-kernel cluster. As the image typically shows one half or less of a corn ear, the total number of kernels can be roughly twice the total number of kernels depicted in the image.

In some embodiments, a default kernel size can be used. Alternatively, the orientation of the corn as depicted in the image can be determined, and classification of a connected area into a single kernel or a multi-kernel cluster can depend on the location of the connected area. For example, the kernels near the tip of the ear may be smaller. The same or a similar method can be applied to another type of crop that may contain a group of clustered but distinguishable components and isolated components, such as a pea.

When the number of crops in a field is known, the yield for the field can be estimated by multiplying the yield of a crop by the number of crops in the field. Alternatively, the yield for the field can be estimated based on a small sample of the field that might serve as a better representative of the field than a single crop.

In some embodiments, to estimate the size or volume of a crop, the second model can comprise certain image processing operations based on specific data. As one example, the second model can assume that a background object of a known size, such as a piece of blue cloth to be contrasted with a yellow corn, is also depicted in a generated image. As another example, the second model can assume that camera depth information associated with the generated image is available. The estimated volume of a crop can be used to estimate the number of crops in the field given the size of the field. The estimated volume of the crop can also be used to estimate the weight of crop, which can be combined with the kernel count of the crop to provide an accurate characterization of the yield of the crop, which can then be extended to the yield for the field.

In some embodiments, the server is programmed to prepare a computer program having a set of computer-executable instructions that enables a client computer to manage a crop field evaluation process. The computer program can coordinate communication with various electronic components, such as an image capturing device and a display device, which might be integrated into or reachable by a client computer. Furthermore, the computer program can communicate with an operating system that runs on a client computer to efficiently handle certain image-based operations in coordinating with these electronic components. In addition, the computer program can manage a GUI coupled with a backend engine to process input and output data associated with the GUI. The backend engine could invoke the first model for recognizing diseases and crop types or the second model for estimating crop yield for a crop field. In general, the computer program or the first and second models are relatively compact and can be easily packaged into a mobile app for execution on a typical mobile device.

In some embodiments, the server is configured to transmit the computer program and the models together or separately to a client computer over a communication network. The transmission can be in response to a request from a client computer or automatically according to a predetermine schedule, such as periodically or as soon as the computer program is updated. The server is also programmed to receive images generated by a client computer and related data, such as results of applying the models to the images or user notes including expert input on those images. The server can be further programmed to incorporate these images and related data in updating the models.

3.2 Execution of the Computer Program for Managing a Field Evaluation Process

In some embodiments, a client computer is programmed or configured to send a request to the server for the computer program that enables the client computer to manage a field evaluation process, the first model for recognizing diseases and crop types, and the second model for estimating crop yield for a crop field. The client computer can also be configured to request for the first model or the second model separately. The receipt can be a response to a user instruction or an automatic transmission by the server.

Figure 8:
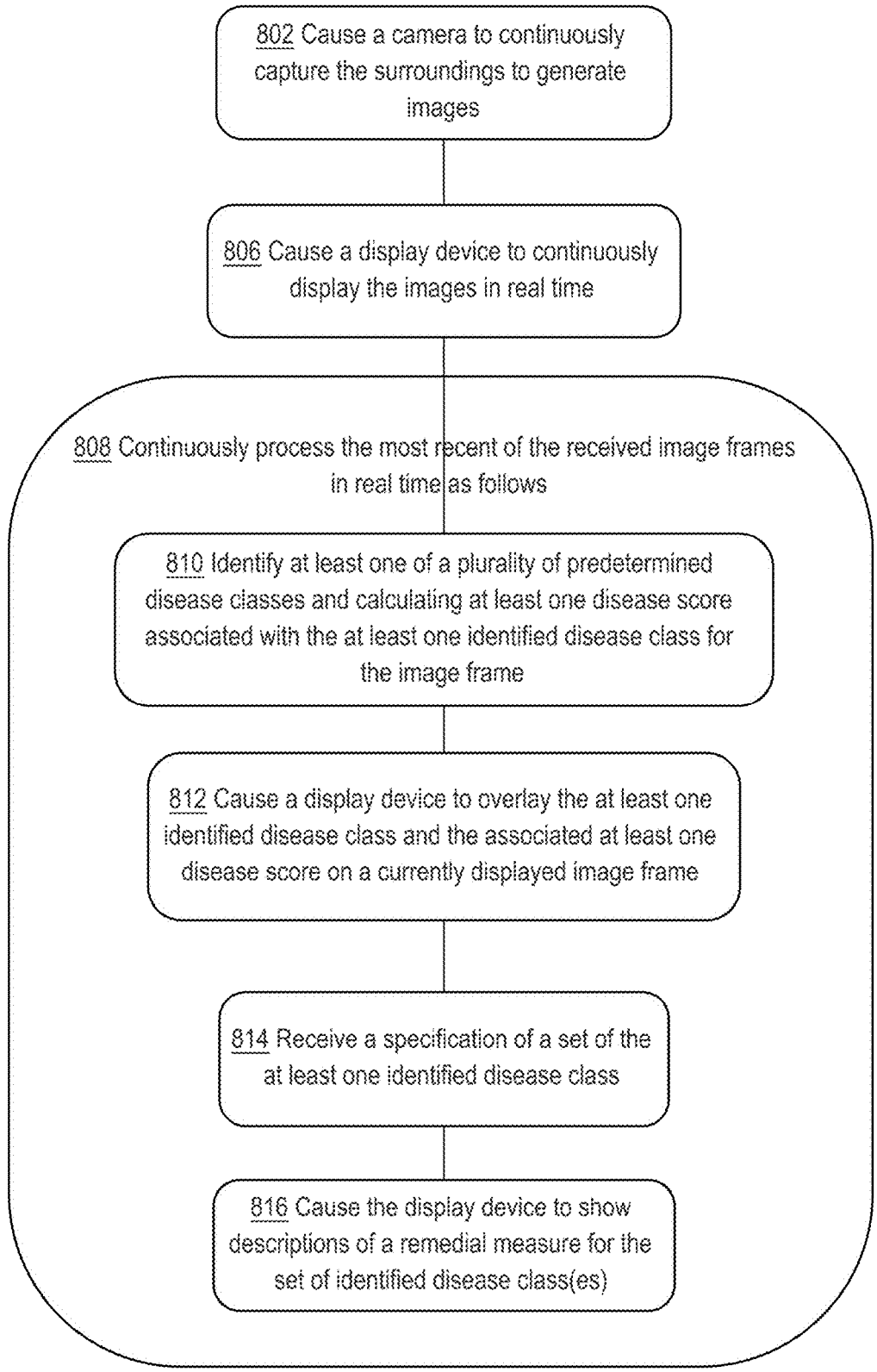
FIG. 8 illustrates an example process performed by a client computer to manage a field evaluation process.

In some embodiments, by executing the computer program, a client computer is configured to manage a field evaluation process as described in FIG. 8. The execution can be in response to a user instruction. FIG. 8 illustrates an example process performed by a client computer, such as a mobile device, to manage a field evaluation process, such as disease recognition and diagnosis. In step 802, the client computer is programmed to cause continuous capture of the surroundings and generation of corresponding images via an integrated or separate image capturing device, such as a camera. The generated images preferably have at least the same resolution as the training images. In step 804, the client computer is programmed to cause continuous display of the generated images in real time—as soon as the images are generated—via an integrated or separate display device, such as a screen. Typically, the display rate is comparable to the generation rate, in which case all the generated images can be displayed in order and in real time.

In step 808, the client computer is configured to continuously process the generated images. When the processing rate is lower than the generation rate, the client computer can be configured to queue up the generated images and process them in order or selectively. For example, the client computer can be configured to process only the newest image at the top of the queue and remove the rest of the images from the queue. Step 808 is broken down into steps 810, 812, 814, and 816, which specifically illustrate disease recognition and diagnosis. The processing can also be crop yield estimation.

3.2.1 Recognizing Diseases or Crop Types

In step 810, the client computer is configured to execute the first model for recognizing diseases or crop types on the image being processed. The execution can occur in response to receiving an image for processing or a user instruction. For each image being processed, the first model produces a distribution of probabilities into the plurality of predetermined diseases. For each of the plurality of predetermined diseases, the client computer can be configured to display the corresponding probability as a disease confidence score that the image depicts an occurrence of the disease. Alternatively, the client computer can send a request including the image being processed to the server for execution of the first model on the image by the server and receive the model execution results from the server.

In step 812, the client computer is configured to cause the display device to display information regarding any recognized disease, the associated confidence score, or other relevant data. The information can be overlaid on the image currently being displayed. As any processing delay is typically sufficiently small in this case, the difference between the processed image and the currently displayed image may not be visible to the human eyes.

In response to the information regarding the recognized diseases and other relevant data, the user may choose to receive more information regarding one of the recognized diseases. In step 814, the client computer is thus programmed to receive a specification of one or more of the recognized diseases.

In step 816, the client computer is programmed to cause the display device to show additional data in response to the specification. The additional data can also be overlaid on a currently displayed image or simply replace that currently displayed image on the screen. The additional data can include descriptions of known causes, symptoms, or remedial measures for the set of diseases, or similar photos for the set of diseases.

In some embodiments, the client computer can be programmed to generate an alert when a calculated confidence score associated with a recognized disease is above a predetermined threshold. This alert is intended to bring to the attention of a grower or any other relevant party the potential occurrence of a disease in a crop. The alert can be in the form of an audio signal or a visual emphasis, such as displaying the disease name and the confidence score in bold or italics, in a larger font, or in continuous flash. The alert can also be in the form of transmitting a message to a remote device.

In some embodiments, the client computer can be programmed to cause display of directions for reaching the specific geographic location where the image receiving a confidence score above the predetermined threshold was taken. The directions are intended to direct the attention of a grower or any other relevant party to a specific crop that has potentially been infected with a disease. The client computer can continuously monitor its geographic location via a GPS or a similar device and cause the display device to continuously overlay the directions on currently displayed images until the client computer's geographic location agrees with the specific geographic location.

In some embodiments, a user might be interested in receiving more information regarding one of the displayed images. The client computer can be configured to receive a selection of a currently displayed image. In response, the client computer can be programmed to stop the continuous processing of generated images and focus on processing the selected image. The client computer can further be programmed to cause the display device to freeze the display until results of the processing become available and then overlay the processing results on the next generated image. At this point, the original continuous display and processing of generated images can be resumed.

In some embodiments, the client computer is programmed to receive feedback from growers, pathologists, agronomists, or other parties on the generated images and the results of executing the models on the generated images. As one example, a grower as a user of the client computer can indicate an agreement or disagreement with a recognized disease or the associated confidence score, and the client computer can send the image, the model execution result, and the user feedback back to the server for enhancing the models. As another example, the client computer can be programmed to transmit the image and the model execution result to a remote device of a pathologist. The client computer can be further programmed to similarly receive an agreement or disagreement with the recognized disease or the associated confidence score and transmit the image, the model execution result, and the user feedback to the server. The client computer can also be configured to send the images and the model execution results without any user feedback back to the server when the images satisfy certain predetermined criteria, such as being associated with confidence scores above the predetermined threshold. In general, the client computer does not need to store the training images or the images generated by the camera, thus maintaining a relatively small footprint.

In some embodiments, the client computer is not being carried through a crop field by a user. The discussion above continues to mostly apply. The client computer may be integrated into an UAV. In this case, a grower may be operating the UAV remotely through a remote device. The display device might then be separate from the client computer and instead be integrated into the remote device. Any display delay can be handled in a similar manner as any processing delay noted above. Alternatively, the client computer may remain in a remote location and rely on an UAV as the image capturing device. Instead of causing display of the directions to a specific geographic location where an image was taken, the client computer can be configured to send the directions to the UAV in accordance with the computer program received from the server.

FIG. 9, FIG. 10, FIG. 11, FIG. 12, and FIG. 13 illustrate a GUI managed by a client computer through input and output devices regarding disease recognition and diagnosis. The GUI can be part of the computer program received from the server, such as a mobile app, as discussed above. Each diagram of a GUI example in this disclosure comprises an example of output that one or more computers may render in response to instructions from the server or contained with the computer program. The instructions may be in a markup language or programmatic calls to library functions that are executed either at the server or the other computers. The size of areas, regions or panels may vary in different embodiments and are not shown to scale, or in any particular format or arrangement that is required. Similarly, colors, borders, typefaces and other graphical elements may be different in other embodiments and may be specified using configuration data, parameters of calls, or in the instructions.

Figure 9:
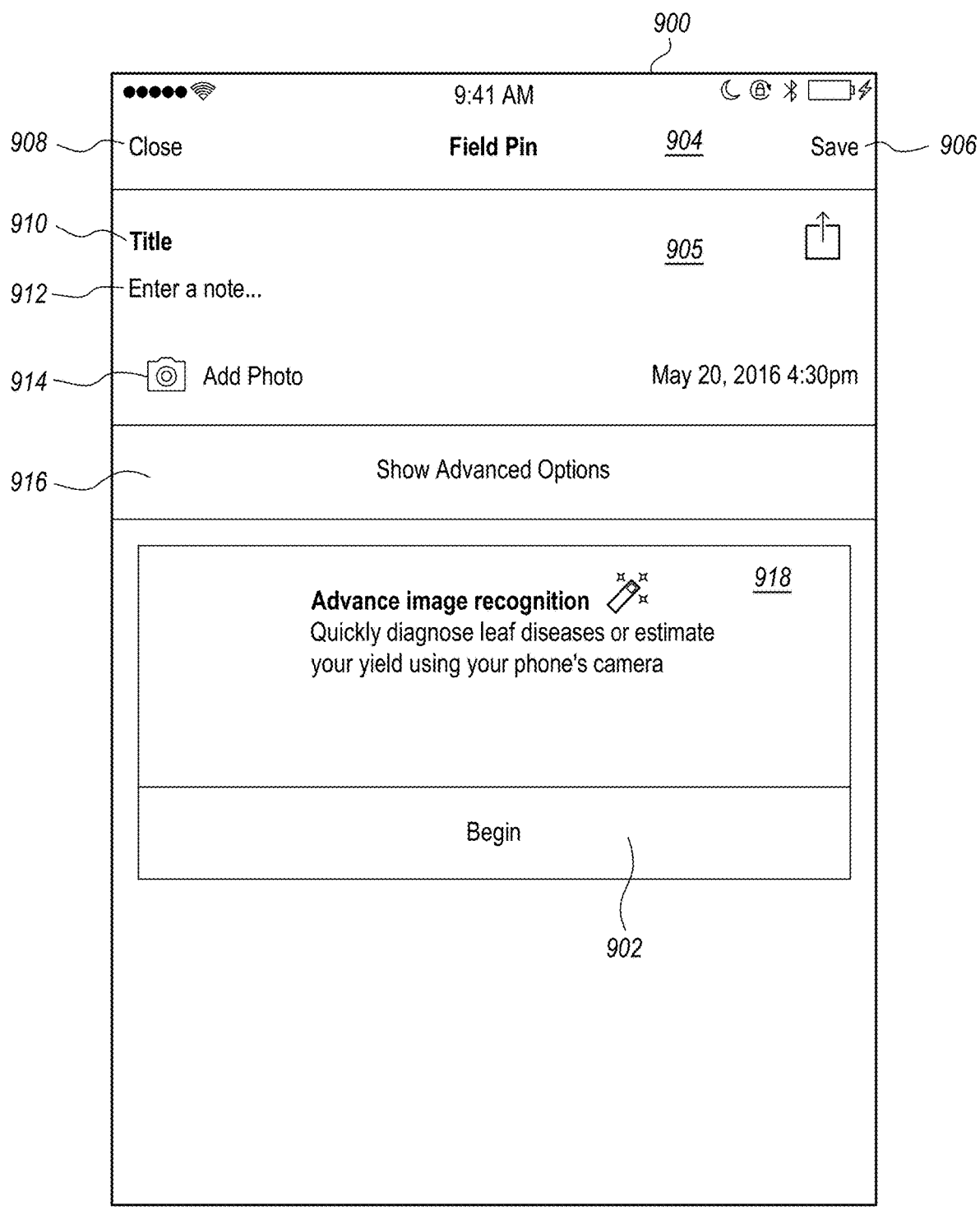
FIG. 9 illustrates an example computer interaction device showing a graphical user interface ("GUI") under program control that allows a user to invoke the disease recognition functionality.

FIG. 9 illustrates an example computer interaction device showing a GUI generated under program control that allows a user to invoke the disease recognition functionality. In an embodiment, an interaction area 900 comprises a header panel 904, title panel 905, and image prompt panel 918. In an embodiment, header panel 904 displays a title of a function of the associated app which, in the example of FIG. 9, indicates that the interaction device is then currently accepting data relating to a pin location within a field. In an embodiment, selecting a Save icon 906 causes the app to save the then-currently displayed data in app storage or networked storage and selecting a Close icon 908 causes changing program control to an earlier state from which the field pin function was reached. In an embodiment, title panel 905 comprises a title field 910, note field 912, photo icon 914, and advanced options button 916. In an embodiment, selecting title field 910 causes the app to prompt the user to provide input specifying a title, which is redisplayed in the title panel 905 and stored in memory. Typically, the title is a name of the pin in the field; an example might be "central corn sample". In an embodiment, selecting note field 912 causes the app to receive input specifying a note about the associated field pin. In an embodiment, selecting the photo icon 914 causes the app to programmatically access a camera of the mobile computing device by calling an operating system primitive or service and then await capture of a digital image from the camera; the captured image may be redisplayed. In an embodiment, input selecting the advanced options button 916 causes displaying the image prompt panel 918, which otherwise is not visible. In an embodiment, the image prompt panel 918 is a first display in a succession of displays and prompts that permit accessing image analysis functions relating to the image that was captured or other images. By clicking on the Begin button 902, the user can invoke the disease recognition functionality, for example. The computer program can also be set up such that disease recognition starts immediately upon its launch.

Figure 10:
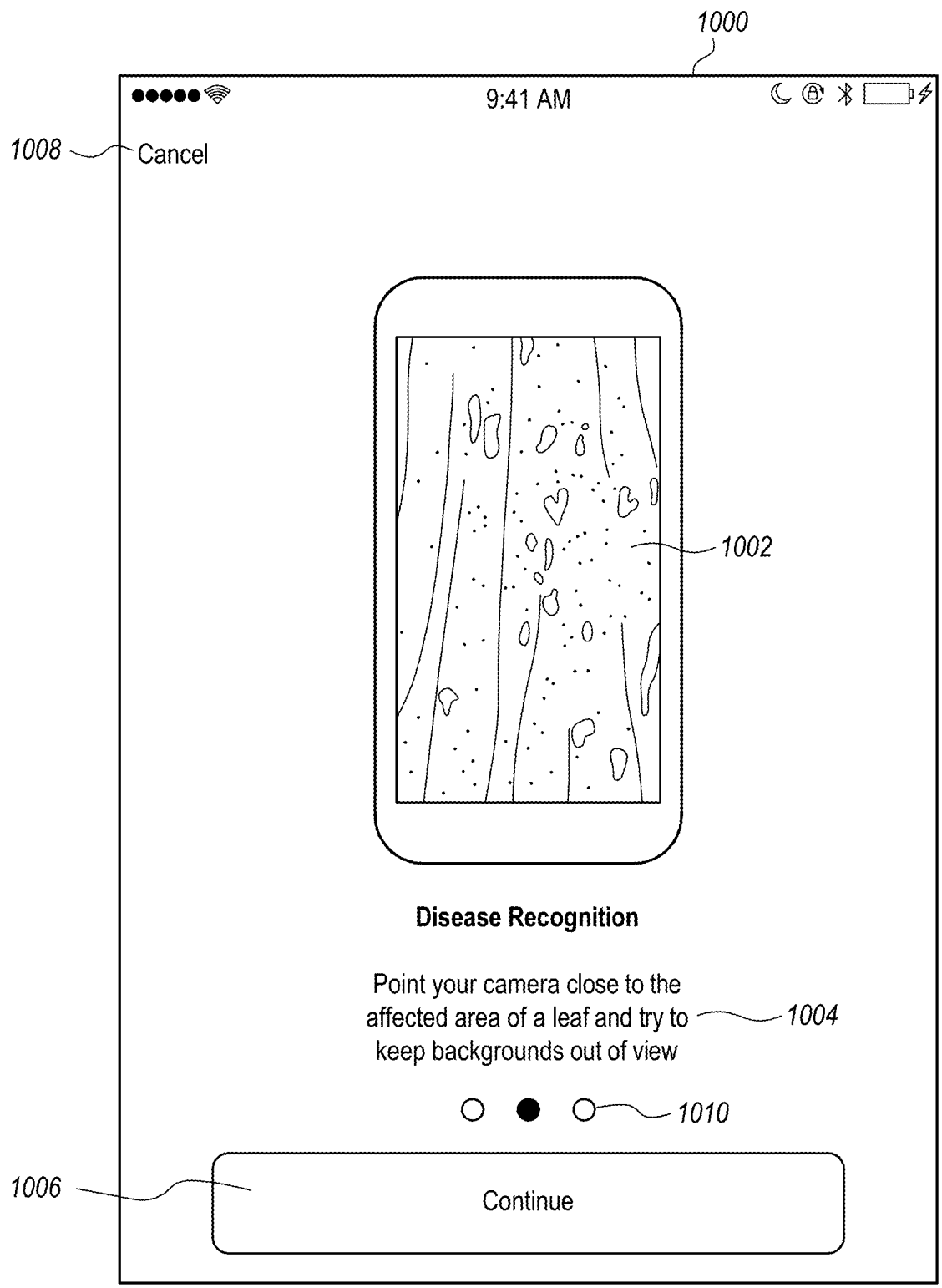
FIG. 10 illustrates an example computer interaction device showing a GUI under program control that can provide a summary of or tutorial on how to realize the disease recognition functionality.

FIG. 10 illustrates an example computer interaction device showing a GUI generated under program control that can provide a summary of or tutorial on how to realize the disease recognition functionality. In an embodiment, an interaction area 1000 comprises an image field 1002, a text field 1004, a stage indicator 1010, a Continue button 1006, and a Cancel icon 1008. The text field 1004 and image field 1002 provide instructions for operating a camera, such as one integrated into the client computer, to continuously scan the surroundings and generate a series of images depicting the surroundings. The image field 1002 can display a photo of an actual crop. Selecting the Cancel icon 1008 causes changing program control to an earlier state from which the interaction area 1000 was reached. The stage indicator 1010 shows the current stage in the summary or tutorial, such as the second page of three pages. Selecting the Continue button 1006 causes changing program control to the next stage in the summary or tutorial, such as the third page of the three pages.

Figure 11:
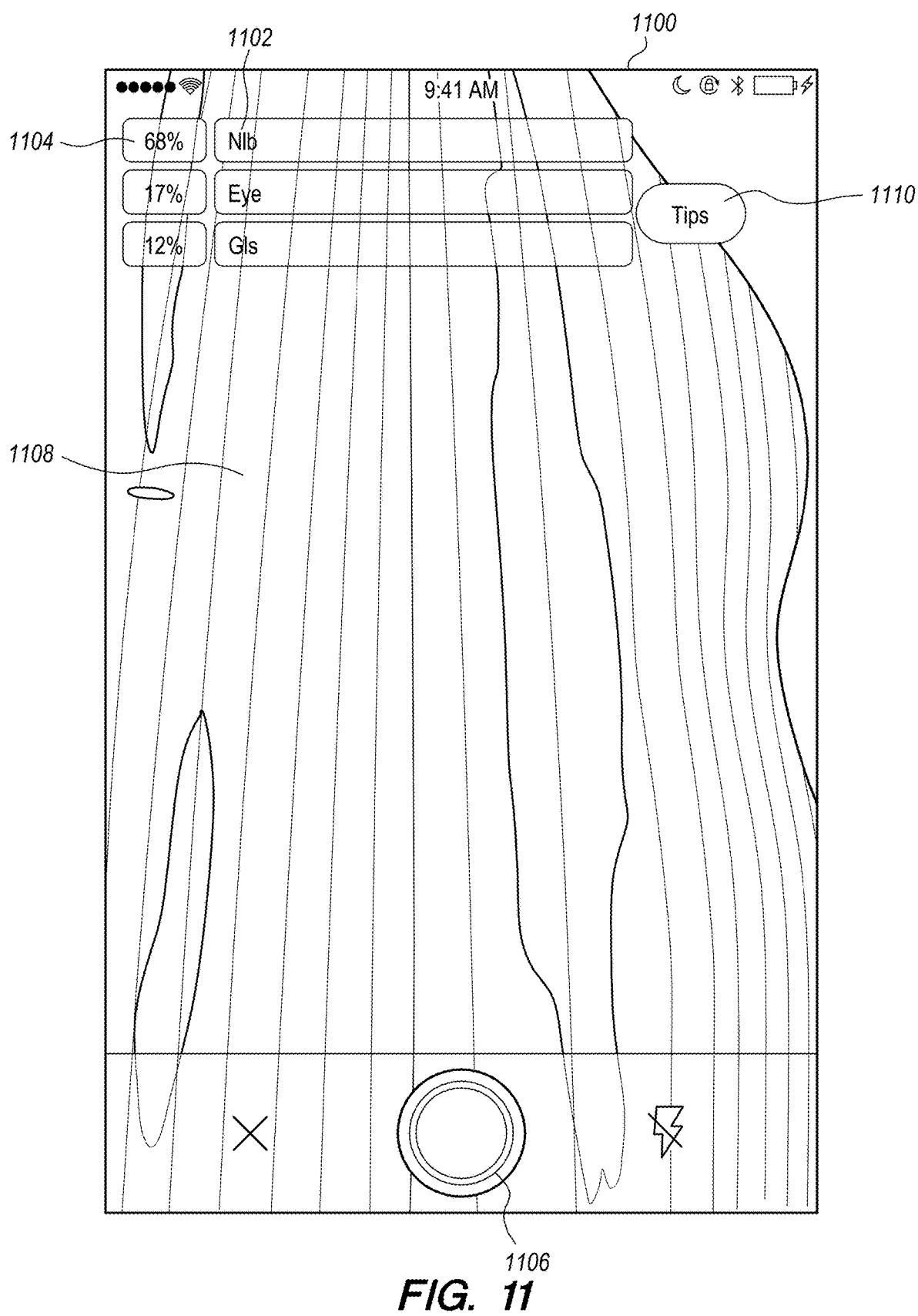
FIG. 11 illustrates an example computer interaction device showing a GUI under program control that can display results of analyzing generated images and receive requests to analyze select generated images.

FIG. 11 illustrates an example computer interaction device showing a GUI generated under program control that can display results of analyzing generated images and receive requests to analyze select generated images. In an embodiment, an interaction area 1100 comprises a disease image area 1108, a Tips icon 1110, and an image capture area 1106. As the series of images are generated at a high generation rate, the series of images can be displayed at a similarly high display rate in real time, which would look like a continuous video. The computer interaction device can show each generated image in the disease image area 1108 in real time. As the series of images are generated, the series of images can also be processed for disease recognition in order or selectively in real time. The computer interaction device can then show the processing results, such as information regarding one or more recognized diseases in a disease classification area 1102 and the corresponding one or more confidence scores in a confidence score area 1104, on top of the currently displayed image. The processing results generally indicate that any crop depicted in the processed image may be infected with the one or more diseases for the respective confidence scores or probabilities of infection. In this example, the currently displayed image depicts a corn leaf, the currently processed image probably depicts the same leaf, and that leaf is likely to have been infected with NLB for a probability of 68%, with EYE for a probability of 17%, and with GLS for a probability of 12%.

In one embodiment, the computer interaction device can also allow a user to select the currently displayed image, such as through a capture button in the image capture area 1106, to interrupt the continuous processing of generated images and immediately process the selected image. Alternatively, the disease recognition functionality does not involve automatically processing the series of generated images but can only rely on a user to click on the image capture button, for example, to select an image for processing. Selecting the Tips icon 1110 can cause display of additional information, such as more basic attributes of the crop depicted in the currently displayed image, a summary of how to interpret the displayed information regarding the recognize diseases and the confidence scores, or a summary of how to receive disease recognition information for the currently displayed image.

FIG. 12 illustrates an example computer interaction device showing a GUI generated under program control that can provide additional information about recognized diseases. In one embodiment, an interaction area 1200 comprises a header panel 1214, a disease image area 1202, a disease classification area 1204, a confidence score area 1206, a symptoms panel 1208, a pathogen panel 1210, and a feedback area 1212. In an embodiment, the header panel 1214 displays a title of a function of the associated app which, in the example of FIG. 12, indicates that the interaction device is then currently displaying data relating to a disease infected by a crop in the field. In response to a specification of one of the recognized diseases, which can result from a selection of displayed information regarding the specified disease overlaid on an image depicting the specified disease, the computer interaction device can redisplay the image or may be a portion of the image that clearly depicts the recognized disease in the disease image area 1202. The computer interaction device can further overlay the information regarding the specified disease in the disease classification area 1204 and the corresponding confidence score in the confidence score area 1206 on the depiction of the specified disease. In addition, the computer interaction device can display additional data regarding the specified disease, such as a list of symptoms in the symptoms area 1208 or a list of pathogens involved in the pathogen in the area 1210.

In one embodiment, the computer interaction device can also allow a user to provide feedback on the automatic analysis, such as information regarding the recognized diseases and the calculated confidence scores. By clicking on YES or NO in the feedback area 1212, the user can indicate an agreement or a disagreement with the automatic analysis. The computer interaction device can also enable a user to correct the analysis results or provide notes or additional data for the analysis results.

Figure 13:
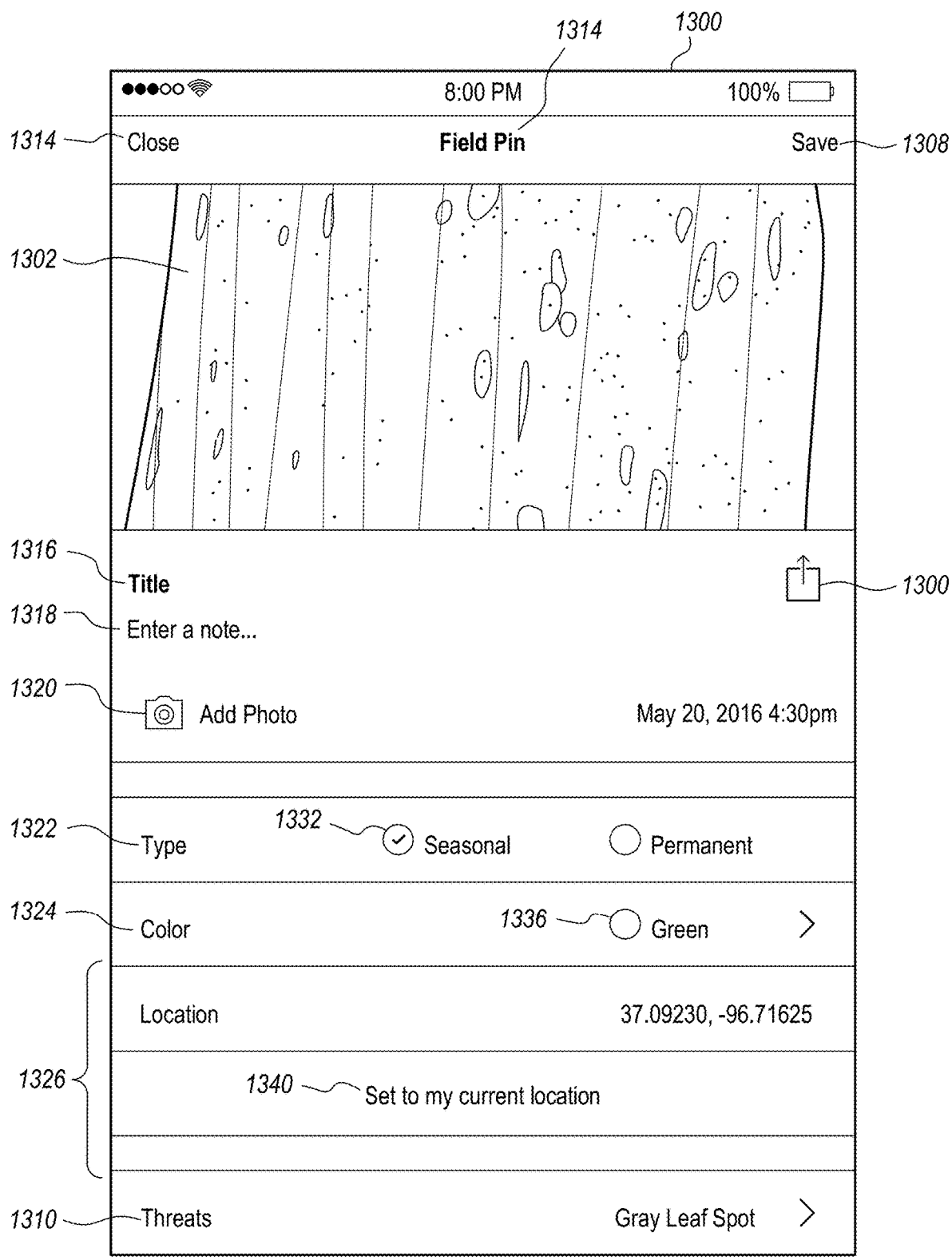
FIG. 13 illustrates an example computer interaction device showing a GUI under program control that can enable a user to store or upload a generated image or provide metadata for the generated image.

FIG. 13 illustrates an example computer interaction device showing a GUI generated under program control that can enable a user to store or upload a generated image or provide metadata for the generated image. In one embodiment, an interaction area 1300 comprises a header panel 1312, a disease image area 1302, a title panel 1316, a type panel 1322, a color panel 1324, a location panel 1326, and a threats panel 1310. In an embodiment, the header panel 1312 displays a title of a function of the associated app which, in the example of FIG. 13, indicates that the interaction device is then currently accepting data relating to a pin location within a field. In an embodiment, selecting a Save icon 1308 causes the app to save the then-currently displayed data in app storage or networked storage and selecting a Close icon 1314 causes changing program control to an earlier state from which the field pin function was reached. In an embodiment, in response to a selection of an image previously displayed by the computer interaction device and subsequent analysis of the selected image, the computer interaction device can redisplay the selected image or a portion of the image that clearly depicts a recognized disease in the disease image area 1302.

In an embodiment, the title panel 1316 shows a title and comprises a note field 1318 a photo icon 1320, and an upload icon 1300. Typically, the title is a name of the pin in the field or the subject matter of the image displayed in the disease image area 1302; an example might be "central corn sample". In an embodiment, selecting an upload icon 1306 can cause the client computer to transmit the image to the server. In an embodiment, selecting note field 1318 causes the app to receive input specifying a note about the associated field pin. In an embodiment, selecting the photo icon 1320 causes the app to programmatically access a camera of the client computer by calling an operating system primitive or service and then await capture of a digital image from the camera; the captured image may be redisplayed.

In one embodiment, the type panel 1322 can indicate a type of disease, such as seasonal or permanent, that was determined from analyzing the image. The type panel 1322 can also allow overriding of the indicated type of disease or a fresh selection from a predetermined list of types using radio buttons 1332, check boxes, or other components. The color panel 1324 can indicate a color of the crop depicted in the image, such as green or yellow, that was determined from analyzing the image. The color panel 1324 can also allow overriding of the indicated color of the crop or a fresh selection from a predetermined list of colors using radio buttons 1336, check boxes, or other components. The location panel 1326 can indicate a geographical location where the image was taken, in terms of GPS coordinate, for example. The location panel 1326 can also accept a selection of the setting field 1340 that cause the geographical location to be set to the current location as measured by a GPS integrated into the client computer. In addition, the threats panel 1310 can display additional information regarding the image, such as information identifying the recognized disease.

3.2.2 Estimating Crop Yield

Referring back to FIG. 8, step 808 can similarly be broken into multiple steps for crop yield estimation. The client computer can be configured to execute the second model for estimating crop yield on the image being processed. Specifically, when the execution of the first model leads to a determination of a crop type, the crop type can be an input to the second model for selecting a technique specific to the crop type. For each image being processed, the second model can produce an estimated yield for a crop or for a field of crops or other related data. The related data can include an identification of the different areas of a crop, such as the tip of a corn ear, the rest of the ear, individual kernels, or each cluster of kernels. Alternatively, the client computer can send a request including the image being processed to the server for execution of the second model on the image by the server and receive the model execution results from the server. The client computer can then be configured to cause the display device to overlay the yield information or other related data on the image currently being displayed.

Figure 16:
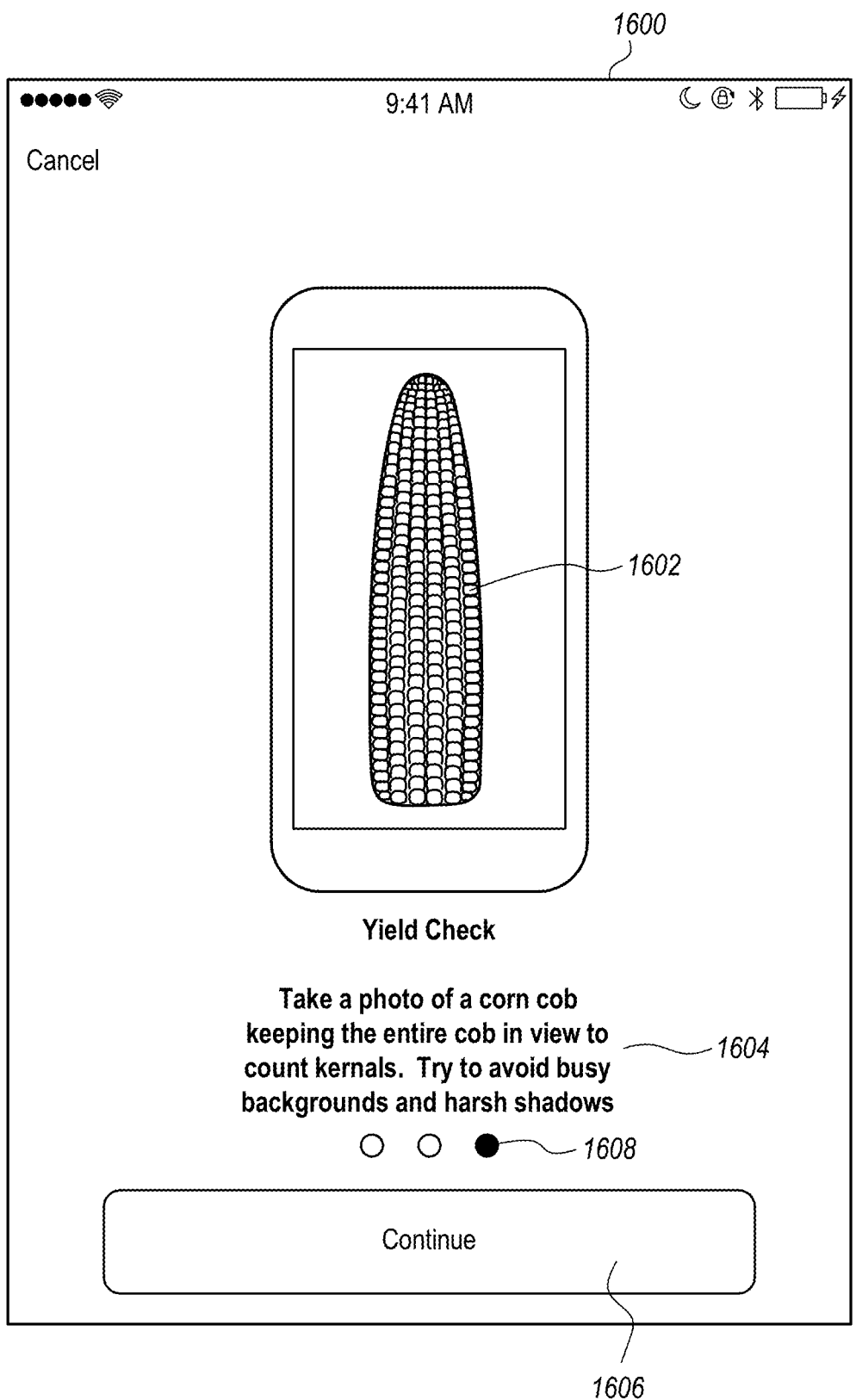
FIG. 16 illustrates an example computer interaction device showing a GUI under program control that can provide a summary of or tutorial on how to realize the yield estimation functionality.
Figure 17:
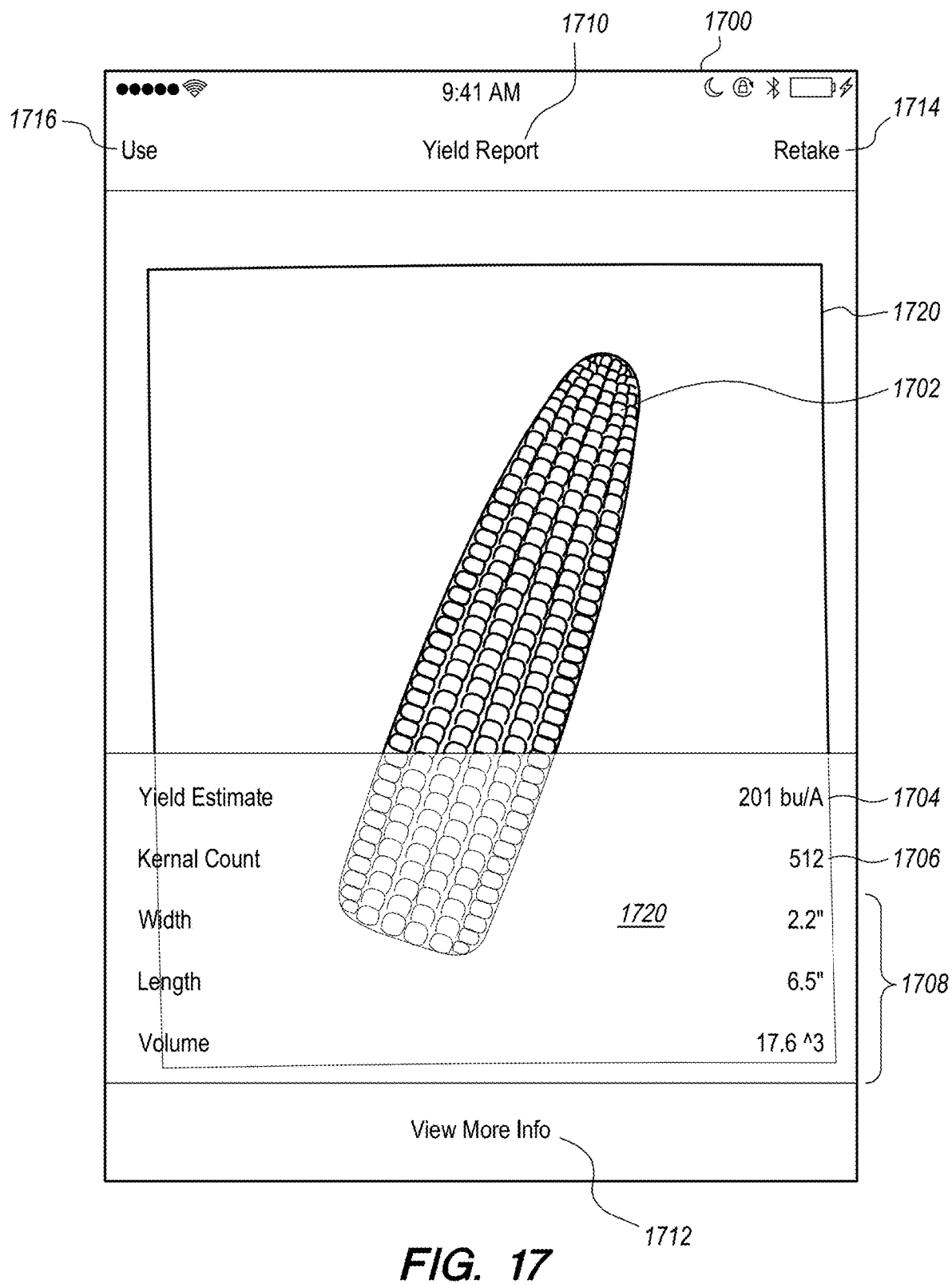
FIG. 17 illustrates an example computer interaction device showing a GUI under program control that can display yield information.

FIG. 16 and FIG. 17 illustrate a graphical user interface managed by a client computer through input and output devices regarding crop yield estimation. FIG. 16 illustrates an example computer interaction device showing a GUI generated under program control that can provide a summary of or tutorial on how to realize the yield estimation functionality. In one embodiment, similar to the interaction area illustrated in FIG. 10, an interaction area 1600 includes an image field 1602, a text field 1604, a stage indicator 1608, a Continue button 1606, and a Cancel icon. The text field 1604 and image field 1602 provide instructions for operating a camera, such as one integrated into the client computer, to direct the camera to a crop, such as a corn, to generate an image of the crop for processing. The image field 1602 can display a photo of an actual crop. When the yield estimation functionality is invoked in response to a recognition of a crop type, an image of the crop from another perspective may already be available. For example, when the crop is corn, an image of the corn covered in husk may have been generated, and this GUI can then direct the user to remove the husk to show the ear and the kernels and generate another image of the corn. The stage indicator 1608 shows the current stage in the summary or tutorial, such as the third page of three pages. Selecting the Continue button 1006 causes changing program control to the next stage in the summary or tutorial, such as the third page of the three pages.

FIG. 17 illustrates an example computer interaction device showing a GUI generated under program control that can display yield information. In one embodiment, an interaction area 1700 comprises a header panel 1710 and a crop image area 1702. In one embodiment, the header panel displays a title of a function of the associated app which, in the example of FIG. 17, indicates that the interaction device is then currently displaying data relating to a yield of a crop or a field in which the crop is located. Selecting a Use button 1716 causes the app to generate a yield report based on the image already taken and currently displayed in the crop image area 1702. Selecting a Retake button 1714 causes the app to allow retaking of a photo and generation of a corresponding image to replace the currently displayed image.

In one embodiment, in response to generation of an image and subsequent yield estimation, the computer interaction device can redisplay the image in the area 1702. The computer interaction device can further display the yield estimation data in a yield information area 1720 as an overlay. In this example, the generated image depicts corn, and the computer interaction device displays as yield estimation data including the kernel count 1706 of the corn, volume data of the corn 1708 including the width, the length, and the total size, and the yield estimate of a field in which the corn is located 1704 in terms of bushels per acre. The yield information area 1702 can also include an information request button 1712 that allows a user to request more yield information.

What is claimed is:

1. A computer-implemented method of determining a number of kernels from an image of a corn, comprising:

receiving, by a processor, a digital image that is in encoded in color or gray scale;

segmenting the image into foreground data associated with a corn comprising a group of kernels grown on an ear of the corn and background data, to create an updated image, comprising:
  dividing an enhanced image derived from the image into the foreground data and the background data to create a divided image by performing a constant thresholding method and an adaptive thresholding method being based on a weighted sum of neighborhood values with weights forming a Gaussian window;
  identifying, by the processor, clusters of one or more connected pixels in the foreground data;
  performing thresholding on a size of each of the clusters, thereby classifying the foreground data into one or more single-kernel areas and separate one or more multi-kernel areas based on a size of each of the clusters without further segmenting any of the clusters,
    each of the one or more single-kernel areas corresponding to a single kernel,
    each of the one or more multi-kernel areas corresponding to multiple kernels;
  determining a total number of kernels based on one or more sizes of the one or more single-kernel areas and one or more sizes of the one or more multi-kernel areas;
  causing a display of the total number of kernels.

2. The computer-implemented method of claim 1, the segmenting comprising:
  enhancing the image in contrast to create the enhanced image;
  updating the divided image by removing noise values to create an updated image.

3. The computer-implemented method of claim 2, enhancing the image comprising performing contrast limited adaptive histogram equalization (CLAHE).

4. The computer-implemented method of claim 1, the constant thresholding method being Otsu's Thresholding window.

5. The computer-implemented method of claim 1, dividing the enhanced image further comprising classifying each pixel as foreground data when the constant thresholding method or the adaptive thresholding method returns an above-threshold determination.

6. The computer-implemented method of claim 2, updating the divided image comprising performing morphological transformations of erosion followed by dilation that remove small objects from an image, including breaking a cluster of slightly connected kernels into clusters of individual kernels.

7. The computer-implemented method of claim 1, the performing comprising classifying a cluster of the clusters as a single-kernel area when a size of the cluster is not above a certain threshold and classifying the cluster as a multi-kernel area when the size of the cluster is above the certain threshold.

8. The computer-implemented method of claim 1, the performing further comprising identifying an orientation of the corn in the image and a location within the corn of each of the clusters.

9. The computer-implemented method of claim 1, the determining comprising:
  computing an aggregate size of the one or more single-kernel areas;
  dividing a size of each multi-kernel area of the one or more multi-kernel areas by the aggregate size.

10. The computer-implemented method of claim 1, further comprising estimating a crop yield for a given crop field based on the total number of kernels and a number of crops in the given crop field.

11. The computer-implemented method of claim 10, the estimating being further based on an estimated volume or weight of the corn.

12. The computer-implemented method of claim 1, further comprising determining a number of bushels per acre based on the total number of kernels, a number of crops per acre, and a weight per kernel at standard moisture.

13. A non-transitory storage medium storing instructions which, when executed by one or more computing devices, cause performance of a method of determining a number of kernels from an image of a corn, the method comprising:
  receiving a digital image that is in encoded in color or gray scale;
  segmenting the image into foreground data associated with a corn comprising a group of kernels grown on an ear of the corn and background data, to create an updated image;
  identifying clusters of one or more connected pixels in the foreground data;
  classifying the foreground data into one or more single-kernel areas and separate one or more multi-kernel areas comprising:
    identifying clusters that correspond to isolated kernels that grew in adjacent positions but were separated in the segmenting step; and
    identifying each cluster whose size is between an upper threshold and a lower threshold,
      each of the one or more single-kernel areas corresponding to a single kernel,
      each of the one or more multi-kernel areas corresponding to multiple kernels;
  determining a total number of kernels based on one or more sizes of the one or more single-kernel areas and one or more sizes of the one or more multi-kernel areas;
  causing a display of the total number of kernels.

14. The non-transitory storage medium of claim 13, the segmenting comprising:
  enhancing the image in contrast to create an enhanced image;
  dividing the enhanced image into the foreground data and the background data to create a divided image;
  updating the divided image by removing noise values to create an updated image.

15. The non-transitory storage medium of claim 13, the performing further comprising identifying an orientation of the corn in the image and a location within the corn of each of the clusters.

16. The non-transitory storage medium of claim 13, the determining comprising:
  computing an aggregate size of the one or more single-kernel areas;
  dividing a size of each multi-kernel area of the one or more multi-kernel areas by the aggregate size.

17. The non-transitory storage medium of claim 13, the method further comprising estimating a crop yield for a given crop field based on the total number of kernels and a number of crops in the given crop field.

18. The non-transitory storage medium of claim 17, the estimating being further based on an estimated volume or weight of the crop.

19. The non-transitory storage medium of claim 13, the method further comprising determining a number of bushels per acre based on the total number of kernels, a number of crops per acre, and a weight per kernel at standard moisture.

* * * * *